(12) United States Patent
Funato

(10) Patent No.: US 7,664,126 B2
(45) Date of Patent: Feb. 16, 2010

(54) DATA COMMUNICATION APPARATUS, INTERMITTENT COMMUNICATION METHOD THEREFOR, PROGRAM DESCRIBING THE METHOD AND RECORDING MEDIUM FOR RECORDING THE PROGRAM

(75) Inventor: Nobuhiko Funato, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 528 days.

(21) Appl. No.: 10/522,748

(22) PCT Filed: Jul. 30, 2003

(86) PCT No.: PCT/JP03/09689

§ 371 (c)(1),
(2), (4) Date: Jan. 28, 2005

(87) PCT Pub. No.: WO2004/019521

PCT Pub. Date: Mar. 4, 2004

(65) Prior Publication Data

US 2005/0286422 A1    Dec. 29, 2005

(30) Foreign Application Priority Data

Jul. 31, 2002    (JP)    ............................. 2002-223799

(51) Int. Cl.
*H04L 12/28* (2006.01)
*G01R 31/08* (2006.01)
*H04H 20/28* (2008.01)
*H04N 7/173* (2006.01)

(52) U.S. Cl. .................. 370/412; 370/235; 370/395.64; 370/486; 725/89

(58) Field of Classification Search ................. 370/235, 370/395.64, 412, 428–429, 486; 725/101, 725/106–107, 62, 98
See application file for complete search history.

(56) References Cited

U.S. PATENT DOCUMENTS

| 5,678,229 | A | * | 10/1997 | Seki et al. | .................... 455/572 |
| 5,838,668 | A | * | 11/1998 | Okada et al. | ................. 370/312 |
| 6,438,375 | B1 | * | 8/2002 | Muller | ..................... 455/435.3 |
| 6,625,656 | B2 | * | 9/2003 | Goldhor et al. | ............. 709/231 |
| 6,691,312 | B1 | * | 2/2004 | Sen et al. | ....................... 725/96 |

(Continued)

FOREIGN PATENT DOCUMENTS

JP    7-67164 A    3/1995

(Continued)

*Primary Examiner*—Kwang B Yao
*Assistant Examiner*—Candal Elpenord
(74) *Attorney, Agent, or Firm*—Birch, Stewart, Kolasch & Birch, LLP

(57) ABSTRACT

A data communication method for a wireless communication terminal (101) that receives data transmitted intermittently from a transmitting side and plays the data in real time, includes: a step (502, 606 and 607) for requesting to a server (203) and acquiring therefrom, the data characteristics (401- 405) of the data transmitted intermittently; a step for determining, based on the data characteristics (401-405), the data transmission rate at which data will not cause either overflow or underflow during real-time playback of the data, and the amount of buffering of data to be stored in advance in a buffer memory from the start of data transmission from the transmitting side to the beginning of playback; a step (504, 611) for transmitting the data transmission rate and the amount of buffering to a base station (121, 202).

47 Claims, 12 Drawing Sheets

U.S. PATENT DOCUMENTS

| | | | |
|---|---|---|---|
| 6,721,818 B1 * | 4/2004 | Nakamura | 710/9 |
| 7,051,110 B2 * | 5/2006 | Hagai et al. | 709/231 |
| 7,197,557 B1 * | 3/2007 | Asar et al. | 709/224 |
| 7,209,437 B1 * | 4/2007 | Hodgkinson et al. | 370/230 |
| 2002/0004840 A1 | 1/2002 | Harumoto et al. | |
| 2002/0046311 A1 * | 4/2002 | Kageyama | 710/105 |
| 2002/0052967 A1 | 5/2002 | Goldhor et al. | |
| 2002/0105951 A1 * | 8/2002 | Hannuksela et al. | 370/389 |
| 2002/0150078 A1 * | 10/2002 | Ido et al. | 370/349 |
| 2002/0191722 A1 | 12/2002 | Naruse | |
| 2003/0041158 A1 * | 2/2003 | Hejna, Jr. | 709/231 |
| 2003/0050104 A1 | 3/2003 | Matsumura et al. | |
| 2003/0152093 A1 * | 8/2003 | Gupta et al. | 370/412 |
| 2004/0258084 A1 * | 12/2004 | Laroia et al. | 370/437 |
| 2005/0083938 A1 * | 4/2005 | Newson et al. | 370/394 |

FOREIGN PATENT DOCUMENTS

| | | |
|---|---|---|
| JP | 9-46390 A | 2/1997 |
| JP | 10093540 | 4/1998 |
| JP | 10-275244 A | 10/1998 |
| JP | 2001-223716 A | 8/2001 |
| JP | 2001-268080 A | 9/2001 |
| JP | 2002-84339 A | 3/2002 |
| JP | 2003-87172 A | 3/2003 |
| WO | WO-02/32082 A1 | 4/2002 |

* cited by examiner

| Intermittent period (msec) | BPSK average transmission rate (Kbps) | QPSK average transmission rate (Kbps) | 16QAM average transmission rate (Kbps) |
|---|---|---|---|
| 2 | 6144.0 | 12288.0 | 27648.0 |
| 4 | 3072.0 | 6144.0 | 13824.0 |
| 8 | 1536.0 | 3072.0 | 6912.0 |
| 16 | 768.0 | 1536.0 | 3456.0 |
| 32 | 384.0 | 768.0 | 1728.0 |
| 64 | 192.0 | 384.0 | 864.0 |
| 128 | 96.0 | 192.0 | 432.0 |
| 256 | 48.0 | 96.0 | 216.0 |
| 512 | 24.0 | 48.0 | 108.0 |
| 1024 | 12.0 | 24.0 | 54.0 |
| 2048 | 6.0 | 12.0 | 27.0 |
| 4096 | 3.0 | 6.0 | 13.5 |
| 8192 | 1.5 | 3.0 | 6.8 |
| 16384 | 0.8 | 1.5 | 3.4 |
| 32768 | 0.4 | 0.8 | 1.7 |
| 65536 | 0.2 | 0.4 | 0.8 |

FIG. 4

| Frame No. i (401) | Start time t i (msec) (402) | Data quantity Ci (byte) (403) | Total amount of data required to be obtained by t i (byte) (404) | Total amount of data receivable by t i+1 (byte) (405) |
|---|---|---|---|---|
| 1 | 0 | 270 | 396 | 32,768 |
| 2 | 2,000 | 126 | 516 | 33,038 |
| 3 | 5,000 | 120 | 2,517 | 33,164 |
| 4 | 6,000 | 2,001 | 8,607 | 33,284 |
| 5 | 7,000 | 6,090 | 11,727 | 35,285 |
| 6 | 7,250 | 3,120 | 13,080 | 41,375 |
| 7 | 7,500 | 1,353 | 14,433 | 44,495 |
| 8 | 7,750 | 1,353 | 15,786 | 45,848 |
| 9 | 8,000 | 1,353 | 16,359 | 47,201 |
| 10 | 8,500 | 573 | 16,932 | 48,554 |
| 11 | 8,750 | 573 | 18,285 | 49,127 |
| 12 | 9,250 | 1,353 | 18,552 | 49,700 |
| 13 | 14,250 | 267 | 19,434 | 51,053 |
| 14 | 16,250 | 882 | 21,036 | 51,320 |
| 15 | 17,250 | 1,602 | 27,045 | 52,202 |
| 16 | 17,750 | 6,009 | 28,371 | 53,804 |
| 17 | 18,750 | 1,326 | 29,691 | 59,813 |
| 18 | 19,750 | 1,320 | 30,714 | 61,139 |
| 19 | 20,250 | 1,023 | 31,434 | 62,459 |
| 20 | 20,750 | 720 | 31,434 | 63,482 |
| ⋮ | ⋮ | ⋮ | ⋮ | ⋮ |

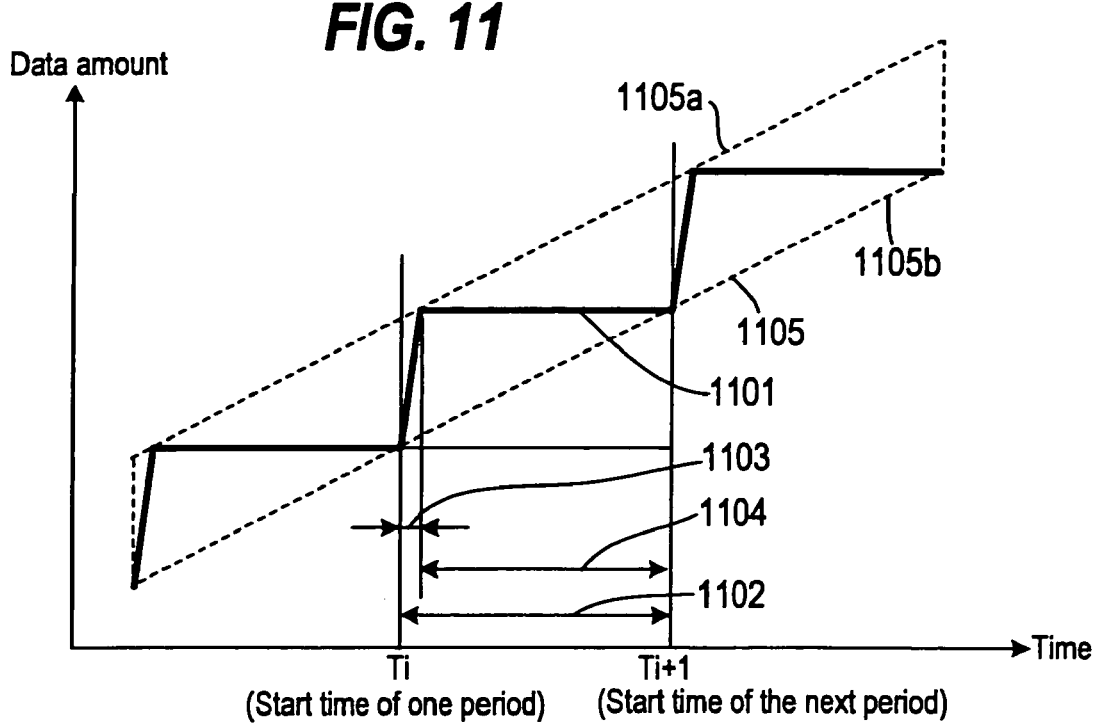
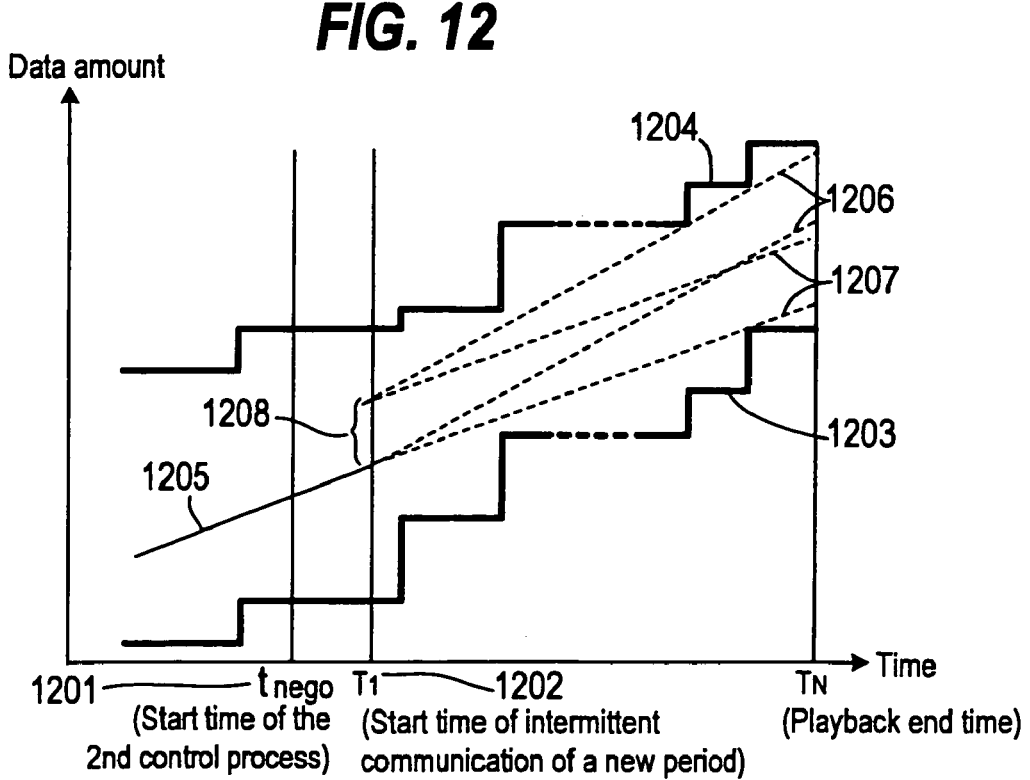

DATA COMMUNICATION APPARATUS, INTERMITTENT COMMUNICATION METHOD THEREFOR, PROGRAM DESCRIBING THE METHOD AND RECORDING MEDIUM FOR RECORDING THE PROGRAM

TECHNICAL FIELD

The present invention relates to a data communication apparatus for performing, in parallel, reception and playback of multimedia data obtained through wireless communication and its intermittent communication method, and in particular relates to a data communication apparatus with which power consumption at wireless communication terminals can be cut down, an intermittent communication method thereof and a program describing the method and a recording medium for recording the program.

BACKGROUND ART

A technique with which a terminal unit having a communicating means performs playback and reception of multimedia data in parallel, is called streaming play or simply streaming. Streaming enables a terminal to reproduce long multimedia data having a greater amount of data than the memory capacity of the terminal, and enables multimedia data to start playing without waiting for the entire data to download.

As typical streaming protocols, RTP (Real-Time Transport Protocol) and RTCP (RTP Control Protocol) (RFC1889) for data transmission, RTSP (Real-Time Streaming Protocol) (RFC2326) for session control can be mentioned, and they are used for exchange of data and control information between the transmitting side (server) and receiver and player side (terminals) in a system (streaming system) that handles streaming.

The server in a streaming system needs to continue supplying multimedia data at a proper transmission rate to the terminal side so as not to cause receiver buffer overflow or underflow of the multimedia data to be played on the terminal, or so that congestion will be unlikely to occur on the network en route. Since the transmission rate required by multimedia data occupying the transmission band is generally large, in most of the conventional streaming systems, the communicating means is continuously used during a session (e.g., a sequence of data communication from the beginning to the end of a certain unit of transmission data) (this will hereinbelow be referred to as "1st prior art").

For portable type wireless communication terminals which mostly have a lower amount of memory capacity, streaming is effective in playing long content. However, since wireless communication is the most power consumptive process, portable type wireless communication terminals, which are in most cases driven by batteries, have suffered from the rapid battery exhaustion problem with the conventional streaming system that continuously uses the communicating means during play.

On the other hand, there have been some technologies of reducing power consumption of wireless communicating means without missing any transmitted data by using intermittent communication, though they are not aimed at application to streaming. Examples of such technologies include the power saving mode defined in the ARIB (Association of Radio Industries and Business) standard T70 (commonly called "HiSWANa"), the power saving mode defined in IEEE standard 802.11 and the technology disclosed in Japanese Patent Application Laid-open Hei 7-67164.

In any of the technologies, the transmitting side wireless appliance repeatedly transmits data within every limited period while the receiving side receives the transmitted data by keeping synchronization with the transmitting side by an appropriate means. In this operation, since data transmission stops in the time span from the end of transmission of a certain period to the beginning of the next period, it is stated that power consumption can be cut down by shutting the electric supply to the communicating means of the receiving side wireless appliance during the time span (this will hereinbelow be referred to as "2nd prior art").

However, since the above second prior art judges that operation should be switched to the intermittent communication mode if the state where the amount of communication per unit time between the wireless communication terminal and the base station is low has persisted for a certain period of time, this method has not been applied to the streaming systems that use the communicating means continuously through the entire session.

If intermittent communication is simply applied to a streaming system, there occurs the problem of data underflow (a lack of data) on the receiving side during a halt of data transmission since, once power supply to the communicating means is stopped, data cannot be received from the cessation to the start of the next intermittent period.

As the countermeasure against occurrence of underflow, it is possible to consider a system in which transmission of multimedia data starts first so that the data can be buffered previously before streaming playback starts. However, in portable wireless communication terminals, which mostly have a low memory capacity, there occurs the problem in that the requirement for reception buffer memory capacity cannot be met if too much buffering is done.

The present invention has been devised in order to solve the above problems, it is therefore an object of the present invention to provide a data communication apparatus and its intermittent communication method, which can cut down the power consumption in the wireless communication process during streaming while the requirement for reception buffer memory capacity can be met when streaming playback is performed in a wireless communication terminal.

DISCLOSURE OF INVENTION

In order to achieve the above object, the present invention is configured as follows:

The main feature of the present invention resides in a data communication apparatus for receiving data transmitted intermittently from a transmitting side and playing the data in real time and its intermittent communication method, and is characterized in that, based on the data characteristic of the data, the transmission information as to the data transmitted from the transmitting side, according to which the data communication apparatus will not cause either overflow or underflow in real-time playback of the data, is determined.

Specifically, an intermittent communication method for data communication apparatus includes: a reception step for storing data received intermittently into a buffer memory; a playback step for playing the stored data in the buffer memory in parallel with the reception step; and a first setup step for setting up a first transmission schedule which will not cause either overflow or underflow of data in the buffer memory, based on the data characteristic of the data.

According to the above configuration, by obtaining the data characteristic of the data transmitted intermittently from a transmitting side, it is possible to determine the first transmission schedule (transmission information) of the data transmitted from the transmitting side, according to which the data communication apparatus will not cause either overflow or underflow during real-time playback of the data (playback of the received data stored in parallel with the storing of the received data). Accordingly, sending this first transmission schedule to the transmitting side makes it possible to positively promote a transition into a mode having a large intermittent period while avoiding overflow and underflow during real-time playing in the data communication apparatus. As a result, it is possible to reduce power consumption in a wireless communication process during streaming when streaming playback is implemented in the data communication apparatus.

Since the data characteristic includes the elapsed time after the start of real-time playback and the necessary total amount of data up to the elapsed time, which mostly have a non-linear relationship, the receiving side is able to determine the first transmission schedule of intermittent communication, according to which no underflow will occur. Further, since the data characteristic includes the total amount of data that will have been used by the elapsed time, it is possible to determine the first transmission schedule of intermittent communication, according to which no overflow will occur either.

The above data characteristic should not be limited to the elapsed time and the two kinds of total data amounts by themselves, but may include the information capable of producing them (including approximate information), e.g., characteristic quantities, relational expressions etc., (including approximate quantities, approximate expressions). In this case, the transmission cost and calculation cost can be cut down though the exactness of the processing is impaired.

The first transmission schedule may include the data transmission rate, and also may include, if necessary, the amount of buffering of data to be stored in advance in the buffer memory from the start of data transmission from the transmitting side to the start of playback. Hence it is possible to designate a transmission rate and an amount of buffering suitable for the actual environment.

Setting the amount of buffering at the maximum in the transmission schedule makes it easy to take a long intermittent period. Setting of the transmission rate at the maximum also makes it easy to take a long intermittent period.

It should be noted, however, that when the communication environment and the protocol do not offer the function of maintaining the quality of service at a constant, the error rate of data transmission may increase when the transmission rate is maximized. In such a case, it is possible to set the transmission rate in the first transmission schedule at the minimum, at the beginning. If the error rate is found to be low, then the intermittent period can be made greater by increasing the transmission rate.

In the actual environment, the amount of buffering may be set to be lower taking into account the margin for a possible emergent request for memory usage or for limiting the user's wait time until start of playback. Also, the data transmission rate may be set smaller than the maximum value by the margin prepared for variations of the transmission environment (e.g., for delay variance). Nevertheless, all these settings are able to provide similar operational effects. Accordingly, "the data transmission rate at the maximum or at the minimum" in the present invention includes "the data transmission rate at approximately the maximum value or at approximately minimum value". "The amount of buffering set at the maximum" includes "the amount of buffering set at around the maximum".

When the data characteristic is not given beforehand, a request to the transmitting side makes their acquisition possible, and based on the data transmission rate, information on a modified intermittent mode, e.g., the time interval or the amount of data transmission to be modified in intermittent communication are determined, and the determined information is sent to the transmitting side, whereby it is possible to control intermittent transmission data on the transmitting side.

The first transmission schedule may include intermittent communication information presenting data transmission quantities during intermittent periods, specifically, the period of intermittent communication, the amount of data transmission in each period, modulation scheme and transmission rate.

Further, the first transmission schedule may include the start time of a new intermittent communication, so that it is possible to change operation on both the transmitter and receiver in synchronization with the first transmission schedule.

Inclusion of a comparison step for comparing the first transmission schedule with the current transmission schedule of the data being communicated and a proposal step for transmitting the first transmission schedule to the communication partner side when the first transmission schedule is different from the current transmission schedule, makes it possible to make a proposal of a new transmission schedule to the communication partner side.

Since the communication partner side may include: a second setup step for setting up a second transmission schedule which will not cause overflow and underflow of data in the buffer memory, based on the data characteristic; and a modification step for modifying the current transmission schedule into the first or second transmission schedule if the first and second schedules are identical, it is possible to change operation into a new transmission schedule between the transmitter and receiver.

It should be noted that the first setup step, comparison step and proposal step may be effected in either the transmitter or receiver, and can be done on the more efficient side, by taking into account the ease of detection of the change in traffic, information in hand, performance of the processor and others.

Further, when data is transmitted from a single transmitter to first and second receivers, it is possible to transfer operation into the same transmission schedule by implementing the aforementioned modification step, both between the transmitter and the first receiver and between the transmitter and the second receiver.

Moreover, the first setup step for setting up the first transmission schedule based on the data characteristic relating to an application of the OSI layer model, may be executed in the data link layer in terms of the OSI layer model, this facilitates change of the intermittent period without causing overflow and underflow in the buffer memory even during streaming playback, when compared to the case where the intermittent period is modified based simply on the amount of transmission per unit time.

The feature of the present invention resides in a data communication apparatus for playing received data, comprising: an inter-node communicator for implementing transmission and reception of data with a communication partner appliance; a buffer memory for storing the data received by the inter-node communicator; a data player for playing the storage data stored in the buffer memory in parallel while the buffer memory is implementing the buffering process of storing the data; a data quality manager for storing the quality management information of the received data to be played;

and a schedule judging portion for transmitting to the inter-node communicator a transmission schedule of the data, according to which the buffer memory will not cause either overflow or underflow, and characterized in that the transmission schedule is set up based on the quality management information.

Another feature of the present invention resides in a data communication apparatus, comprising: an inter-node communicator for transmitting data to a communication partner appliance; a data quality manager for storing the quality management information of the data; and a schedule judging portion for transmitting to the inter-node communicator a transmission schedule of the data, according to which the buffer memory of the communication partner appliance will not cause either overflow or underflow, and characterized in that the transmission schedule is set up based on the quality management information.

Since, with the above configuration, the transmission schedule can be set up based on the quality management information, it is possible to set up a transmission schedule which can prevent overflow and underflow even when a communication device having a low-capacity buffer memory is used for streaming.

Also, inclusion of a data quality reference portion for transmitting the quality management information from the data quality manager to the schedule judging portion and setup of the transmission schedule by the schedule judging portion, makes it possible to send the transmission schedule to the schedule judging portion in an efficient manner, and further makes it possible to efficiently send the setup transmission schedule to the transmitting side by way of the inter-node communicators.

Further, provision of a data quality reference portion for acquiring the quality management information from the data quality manager and setting up the transmission schedule makes it possible to reduce the process load at the schedule judging portion.

Further more, inclusion of an electric power supply controller for stopping electric power supply to the inter-node communicator during the rest time of intermittent communication, in accordance with the transmission schedule, makes it possible to reduce power consumption of the data communication apparatus.

Since the quality management information includes the elapsed time after the start of real-time playback and the necessary total amount of data up to the elapsed time, which mostly have a non-linear relationship, the receiving side is able to determine the transmission schedule of intermittent communication, according which no underflow will occur. Further, since the data characteristic information includes the total amount of data that will have been used by the elapsed time, it is possible to determine the transmission schedule of intermittent communication, according which no overflow will occur either.

The above quality management information should not be limited to the elapsed time and the two kinds of total data amounts by themselves, but may include the information capable of producing them (including approximate information), e.g., characteristic quantities, relational expressions etc., (approximate quantities, approximate expressions). In this case, the transmission cost and calculation cost can be cut down though the exactness of the processing is impaired.

The transmission schedule may include the data transmission rate, and also may include, if necessary, the amount of buffering of data to be stored in advance in the buffer memory from the start of data transmission from the transmitting side to the start of playback. Hence it is possible to designate a transmission rate and an amount of buffering suitable for the actual environment.

Setting the amount of buffering at the maximum in the transmission schedule makes it easy to take a long intermittent period. Setting of the transmission rate at the maximum also makes it easy to take a long intermittent period.

It should be noted, however, that when the communication environment and the protocol do not offer the function of maintaining the quality of service at a constant, the error rate of data transmission may increase when the transmission rate is maximized. In such a case, it is possible to set the transmission rate in the transmission schedule at the minimum, at the beginning. If the error rate is found to be low, then the intermittent period can be made greater by increasing the transmission rate.

The transmission schedule may include intermittent communication information presenting data transmission quantities during intermittent periods, specifically, the period of intermittent communication, the amount of data transmission in each period, modulation scheme and transmission rate.

Further, the transmission schedule may include the start time of anew intermittent communication, so that it is possible to change operation on both the transmitter and the receiver in synchronization with the transmission schedule.

Since the intermittent communication method executed in the data communication apparatus can be described as a program, it is easy to duplicate the intermittent communication method, and it is possible to apply the intermittent communication method to lots of communication devices. Further, recording the program in a recording medium makes it simple to install the program into data communication apparatus.

BRIEF DESCRIPTION OF DRAWINGS

FIG. 4 is a table of characteristics of multimedia data transmitted in the first embodiment of the present invention.

FIG. 11 is a conceptual view showing the relationship between the elapsed time and the amount of transfer data in an intermittent communication mode in the first embodiment of the present invention.

FIG. 12 is a conceptual view showing a calculation process of an intermittent period in FIG. 10.

BEST MODE FOR CARRYING OUT THE INVENTION

The First Embodiment

The first embodiment of a wireless transmission and reception system according to the present invention will be described with reference to the drawings.

Figure 1:
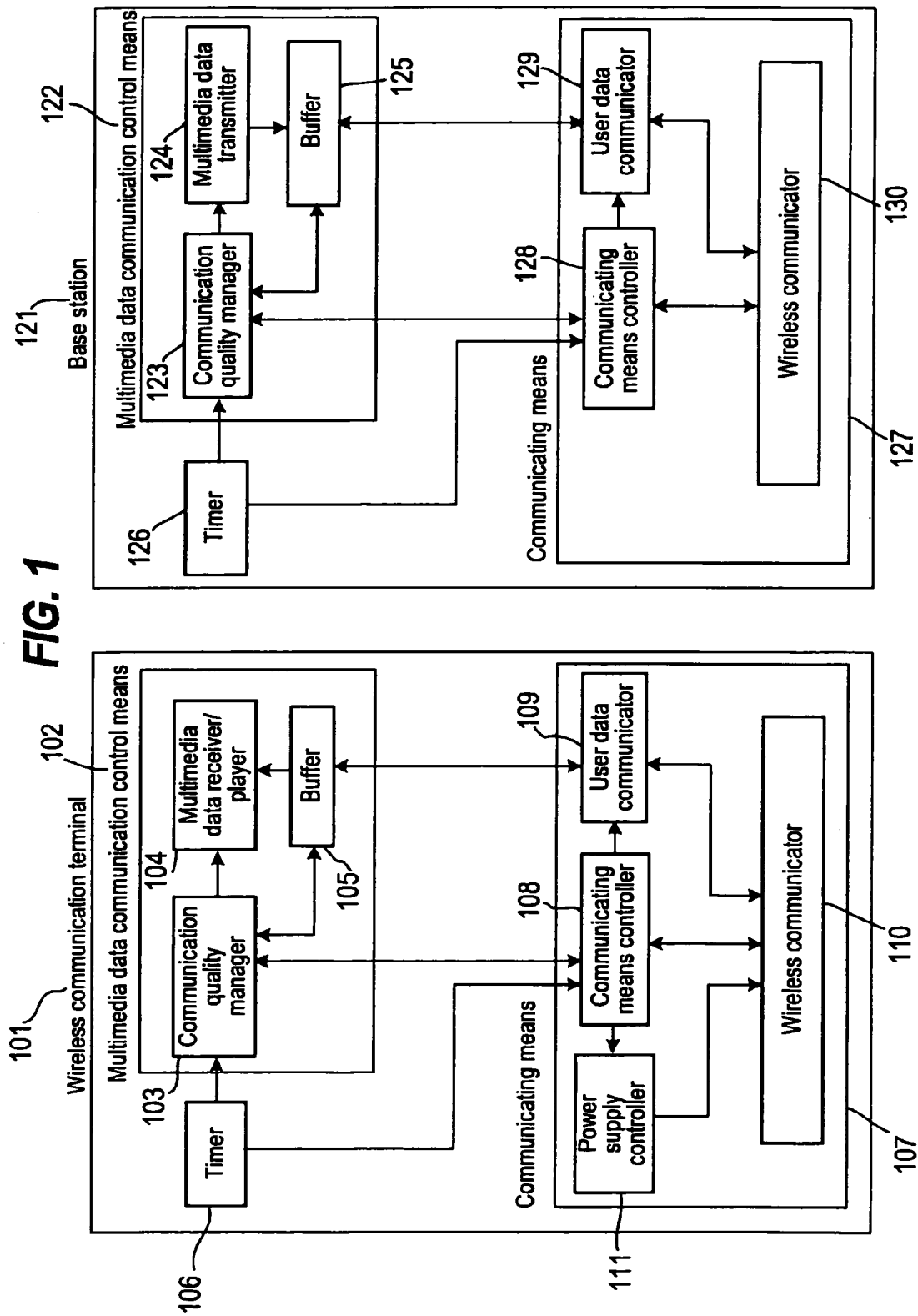
FIG. 1 is a block diagram showing schematic configurations of a wireless communication terminal and a base station for realizing a wireless transmission and reception system according to the first embodiment of the present invention.
Figures 2, 3:
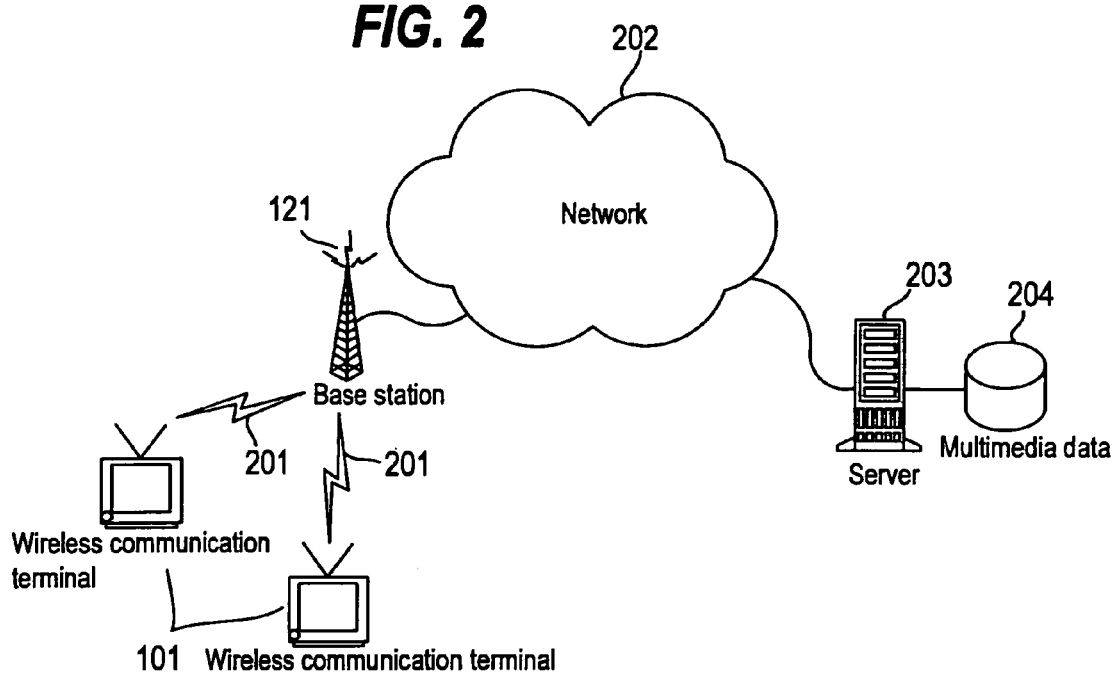
FIG. 2 is a schematic diagram showing device configurations of a streaming system constructed using the wireless communication terminals and base station shown in FIG. 1.
FIG. 3 is a table of characteristics of communicating means according to the first embodiment of the present invention.

FIG. 1 is a block diagram showing schematic configurations of a wireless communication terminal and a base station for realizing a wireless transmission and reception system according to the first embodiment of the present invention. FIG. 2 is a schematic diagram showing device configurations of a streaming system constructed using the wireless communication terminals and base station shown in FIG. 1.

The streaming system made up of wireless communication terminals and a base station for realizing the wireless transmission and reception system according to this embodiment is composed of, as shown in FIG. 2, wireless communication terminals 101, a base station 121, a server 203, multimedia (video (motion pictures, still images), sound, text and the like and a combination of these) data 204.

Server 203 and base station 121 are connected by a network 202, and base station 121 and wireless communication terminals 101 are connected by some unspecified wireless communicating means 201.

Server 203 transmits multimedia data 204 that is stored in accessible storage devices to at least one wireless communication terminal 101, by way of base station 121.

Wireless communication terminal 101 receives and plays transmitted multimedia data 204 in parallel.

Referring to FIG. 1, the detailed configurations of the wireless communication terminal and the base station will be described.

Wireless communication terminal 101 (shown as wireless communication terminal 201 in FIG. 2) includes a multimedia data communication control means 102, a timer 106 and a communicating means 107, as shown in FIG. 1.

The multimedia data communication control means 102 includes a communication quality manager 103, a multimedia data receiver/player 104 and a buffer 105.

The communication quality manager 103 monitors multimedia data received by buffer 105 and gains quality information on the reception error rate, jitter, etc., and statistical information including the amount of reception data and manages them. The communication quality manager 103 also handles procedures, etc., relating to transition to intermittent communication (a communication mode that stops data transmission in the time span from the end of transmission of a certain period to the beginning of the next period) during streaming. This will be detailed later.

Timer 106 is a clock that, for example, estimates the jitter in the communication path, and is able to estimate the jitter by comparing the time stamp given to the multimedia data on the server side and the displayed time on the timer, and is connected to the communication quality manager 103 and an aftermentioned communicating means controller 108.

The communicating means 107 includes communicating means controller 108, a user data communicator 109, a wireless communicator 110 and a power supply controller 111.

The communicating means controller 108 receives signals from the communication quality manager 103, timer 106 and wireless communicator 110, and is able to output data for intermittent communication to power supply controller 111 and wireless communicator 110.

The wireless communicator 110 is able to exchange signals with the communicating means controller 108 and user data communicator 109. In a non-communication duration (interrupted duration) in an intermittent communication mode, power supply from power supply controller 111 is shut down so that power consumption for wireless communication operation is cut down.

The multimedia information transmitted from the transmitting side is received by wireless communicator 110 and sent through user data communicator 109 to buffer 105 and stored therein, in accordance with the control signal from communicating means controller 108. The multimedia information stored in buffer 105 is played back in real time by multimedia data receiver/player 104, based on the time stamps.

In the non-communication period (rest time in intermittent communication) of multimedia information based on the intermittent communication transition process by the communication quality manager 103, electric supply from power supply controller 111 to wireless communicator 110 is shut down so that power consumption for wireless communication can be reduced.

Base station 121 (which is shown as a base station 202 in FIG. 2), similarly to the wireless communication terminal 101 shown in FIG. 1, includes a multimedia data communication control means 122, a timer 126 and a communicating means 127.

This multimedia data communication control means 122 includes a communication quality manager 123, a multimedia data transmitter 124 and a buffer 125. Communicating means 127 includes a communicating means controller 128, a user data communicator 129 and wireless communicator 130.

Communication quality manager 123 manages the amount of data transmission and communicates with communication quality manager 103 on the receiving side as required, so as to keep the quality information in synchronization with communication quality manager 103.

Next, the transition process to intermittent communication during streaming will be described.

[Transmission Band Allocation]

In the present embodiment, wireless communicating means is assumed to be a communicating means substantially conforming to HiSWANa. The HiSWANa communication system is based on a TDMA(Time Division Multiple Access)/TDD(Time Division Duplex) scheme in which 1 MAC(Media Access Control) frame is 2 msec. Since this system has a QoS (Quality of Service: transmission quality including transmission rate, packet loss rate, jitter, etc.) control function, it is possible to allot a definite band for each data link connection between the wireless communication terminal and the base station.

[Modulation Scheme]

Since a plurality of modulation schemes such as BPSK (Binary Phase Shift Keying) 302 having a transmission rate of 6 Mbps, QPSK (Quadrature PSK) 303 having a transmission rate of 12 Mbps, 16 QAM (Quadrature Amplitude modulation) 304 having a transmission rate of 27 Mbps and others are supported, various transmission speeds can be used for different situations. Further, In HiSWANa, it is possible to realize intermittent communication modes. FIG. 3 shows average transmission rates 302, 303 and 304 obtained for different modulation schemes when data is transmitted in only 1 MAC frame in each period when intermittent communication is executed. In the table shown in FIG. 3, the "2 msec" in the column of intermittent period 301 indicates the continuous communication mode where the communicating means is continuously engaged. In the present embodiment, the continuous communication mode and the intermittent communication mode using a period of 2 msec will be used interchangeably, hereinbelow.

There is a tradeoff between transmission rate which is dependent on the modulation scheme, and the error tolerance. When the error rate increases, transition to a modulation scheme having a stronger error tolerance is attempted. However, generally, the stronger the error tolerance, the lower the transmission rate.

[Multimedia Data Characteristic]

In FIG. 2, multimedia data 204 used for streaming is assumed to be data of key frame animation, as disclosed in Japanese Patent Application Laid-open Hei 10-275244. FIG. 4 shows part of the data characteristics of the key frame animation. The symbols shown below are used in FIG. 4 and for explanation hereinbelow.

Key frame No. (i) 401: key frame serial number (1, 2, . . . , N)

Key frame ($K_i$): the i-th key frame

Time ($t_i$) 402: start time of key frame $K_i$

Size ($C_i$) 403: data quantity of key frame $K_i$ $C_{x,y \ldots , z}$: the abridged notation of $C_x + C_y + \ldots + C_z$ Buffer size BC: buffer capacity of the wireless communication terminal In the Key frame animation system used in the present embodiment, in order to render the animation frame at a certain time t, two frames $K_i$ and $K_{i+1}$ of data, meeting the relation of $t_i \leq t < t_{i+1}$ are used, it is therefore necessary to have transmitted the (i+1)th key frame to the wireless communication terminal wireless up to time $t_i$.

Accordingly, the "total amount of data required to be obtained by $t_i$" 404 for time $t_i$ is calculated as $C_{1,2 \ldots , n+1}$. On the other hand, for time $t_i$ the "total amount of data receivable by the wireless communication terminal by $t_{i+1}$ (start time of the next key frame)" 405 can be calculated as $BC + C_{1,2 \ldots , i-1}$, because data in the amount of $C_{1,2 \ldots , i-1}$ has been already used in the time section from $t_i$ to $t_{i+1}$ so that the buffer of this amount can be reused. Here, it is assumed that the buffer size BC=32768 bytes in FIG. 4.

In the present embodiment, for easy explanation, base station 121 is assumed to transmit the data to wireless communication terminal 101 at a constant rate. Though key frame animation is variable-rate multimedia data 204 of which the required bandwidth per unit time greatly changes with regard to time, as seen in FIG. 4, fixing the transmission rate for streaming is advantageous to make transmission control easy and make congestion along the communication path hard to occur.

From the same viewpoint, it is considered to be effective that server 203 also transfers data to base station 121 at a fixed rate, but no detail will be described in this embodiment. In the present embodiment, it is assumed that difference in data transfer rate between server 203 and base station 121 falls within the range that can be absorbed by the buffer of base station 121.

It is also assumed in the present embodiment that the time interval between intermittent periods in an intermittent communication mode is constant. That is, the description of the embodiment hereinbelow shows one example of the procedures for determining the time interval in each intermittent communication mode, and it is assumed that the amount of transmission in each intermittent transmission mode is fixed and is smaller than the amount of data to be transmitted only in 1 MAC frame duration in each intermittent period shown in FIG. 3.

[Execution Sequence of a Streaming Session]

The execution sequence of a streaming session (conversation control) between wireless communication terminals and the server, implemented with equipment and data shown in FIGS. 1 to 4, will be described in accordance with the flowchart shown in FIG. 5 and the sequence chart shown in FIG. 6. Here, in the present embodiment, it is assumed that only a single wireless communication terminal operates, and the multimedia data receiver/player 104 of the wireless communication terminal makes a request for activation of a streaming session.

[Acquisition of Session Information]

Figure 5:
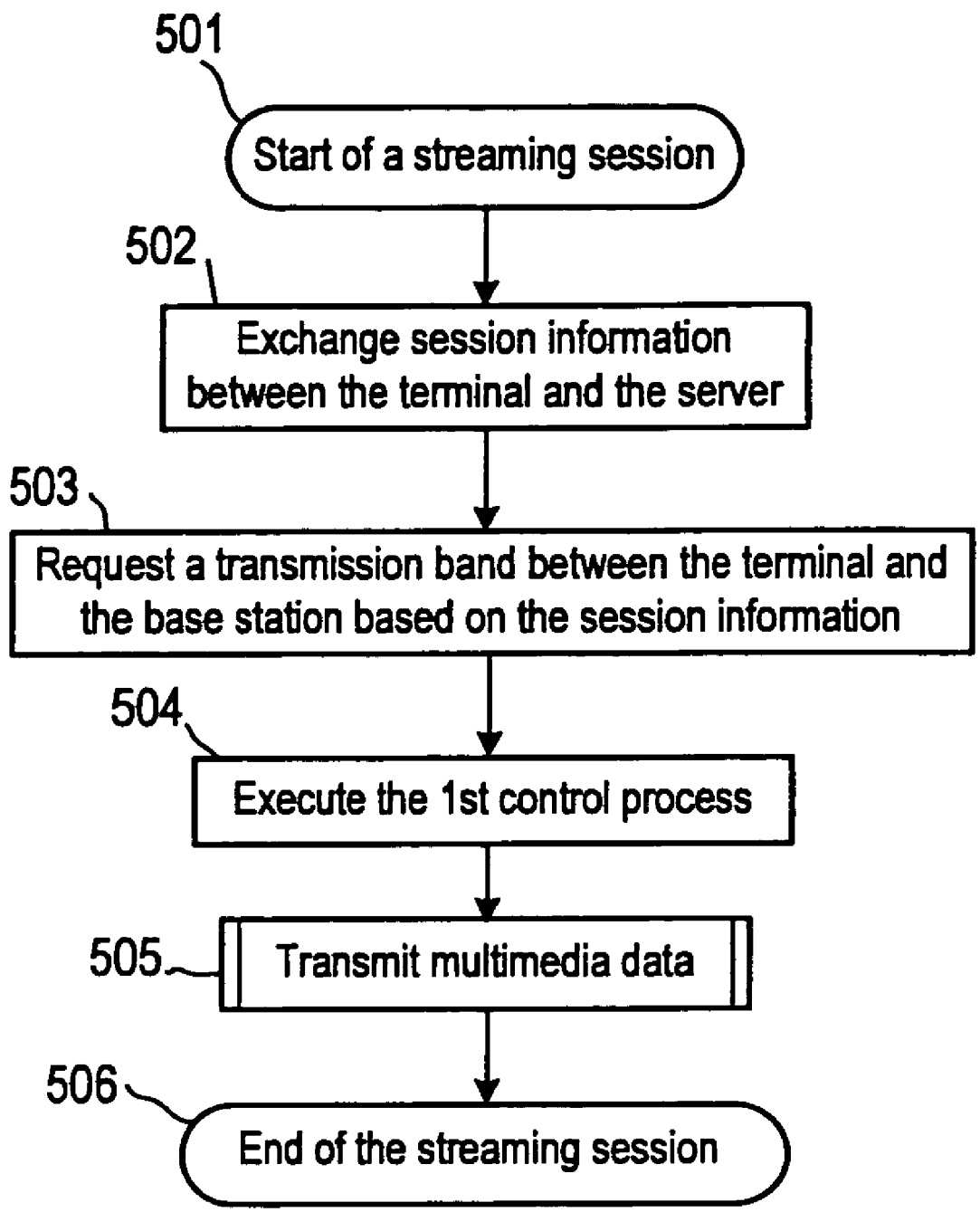
FIG. 5 is a flowchart showing the execution steps of a streaming session in the first embodiment of the present invention.
Figure 6:
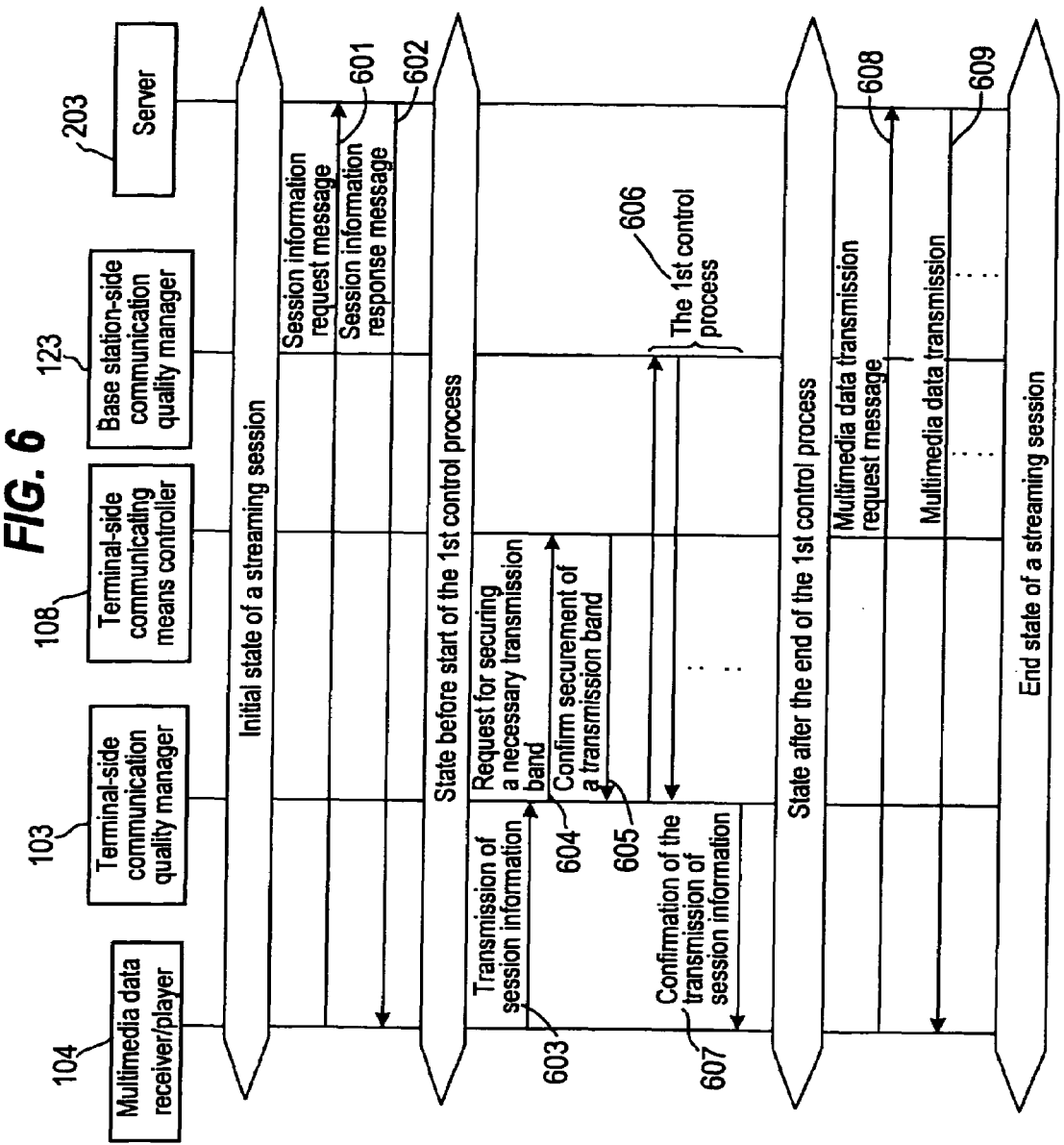
FIG. 6 is a sequence chart showing the execution steps of a streaming session in the first embodiment of the present invention.

As shown in FIGS. 5 and 6, upon start of a streaming session (Step 501), multimedia data receiver/player 104 of wireless communication terminal 101 (FIG. 2) negotiates with server 203 (FIG. 2) to obtain information relating the session (Step 502, 601, 602). The specific way of constructing transmission messages should not be defined in the present embodiment, but the way in which the wireless communication terminal obtains session information may include using a DESCRIBE command (control message), in the aforementioned RTSP, for example. The wireless communication terminal is able to exchange the following control messages using DESCRIBE command so as to obtain session information from server 203.

Request message transmitted from wireless communication terminal 101 (or base station 121) to server 203:

DESCRIBE rtsp://server.example.com/video/data RSTP/1.0

CSeq: 312

Accept:application/sdp, application/rtsl

Response message returned from server 203 to wireless communication terminal 101 (or base station 121):

RSTP/1.0 200 OK

CSeq: 312

Date: 23 Jan. 1997 15:35:06 GMT

Content-Type: application/sdp

Content-Length: 376

Here, description of session information in sdp format is omitted.

[Session Information]

It is assumed in the present embodiment that the session information obtained by the above method includes the characteristics of the multimedia data to be reproduced (e.g., FIG. 4) and the characteristics of the communication path as a channel. If wireless communication terminal 101 (or base station 121) has obtained, in advance, the characteristics of multimedia data and the characteristics of the communication path, inclusion of the data characteristics and communication path characteristics in the session information may be left out.

[Multimedia Data Characteristics]

In the present embodiment, the characteristics of multimedia data are adapted to include required data bandwidth. Further, the characteristics of multimedia data in the embodiment are assumed to include key frame number 401, start time 402, data 403, the total amount 404 of data required to be obtained by $t_i$, the total amount 405 of data receivable by the wireless communication terminal by $t_{i+1}$ (corresponding to the receiving buffer capacity usable from time $t_i$ to $t_{i+1}$). Here, FIG. 4 shows the required data band, indirectly.

The characteristics of multimedia data may be represented by arithmetic expressions such as a liner function, an approximate of a linear function, or the like as long as the elapsed time from the start of data reproduction and the total amount of data up to the elapsed time (including the effective approximate time and quantity) can be obtained.

[Communication Path Characteristics]

The characteristics of the communication path include the average transmission rate available on the entire transmission path between the wireless communication terminal and the server and the average delay time required for transmission.

[Average Transmission Rate]

The average transmission rate on the path is used to check whether the transmission rate, of which the determining method will be shown in the following description of the embodiment, is valid or not. The average transmission rate on the path can be designated by a session control protocol such as RTSP in some cases depending on the capacities of the network and communication devices on the path. If the average transmission rate cannot be designated, the time taken for a round-trip of the DESCRIBE command or the like can be used to approximate it.

Multimedia data receiver/player 104 of wireless communication terminal 101 transfers, at least, the characteristics of multimedia data and the average transmission rate on the path of the obtained session information, to communication quality manager 103 on the wireless communication terminal 101 side (Step 603).

[Calculation of Transmission Schedule]

Communication quality manager 103 of wireless communication terminal 101, based on the obtained session information, calculates the data transmission rate at which data is transmitted from base station 121 to wireless communication terminal 101, and the amount of buffering, i.e., the amount of data to be pre-buffered in reception buffer 105 of wireless communication terminal 101 from the start of transmission to the start of playing.

A method of determining an appropriate transmission rate and the amount of buffering will be described with reference to FIG. 7.

Figure 7:
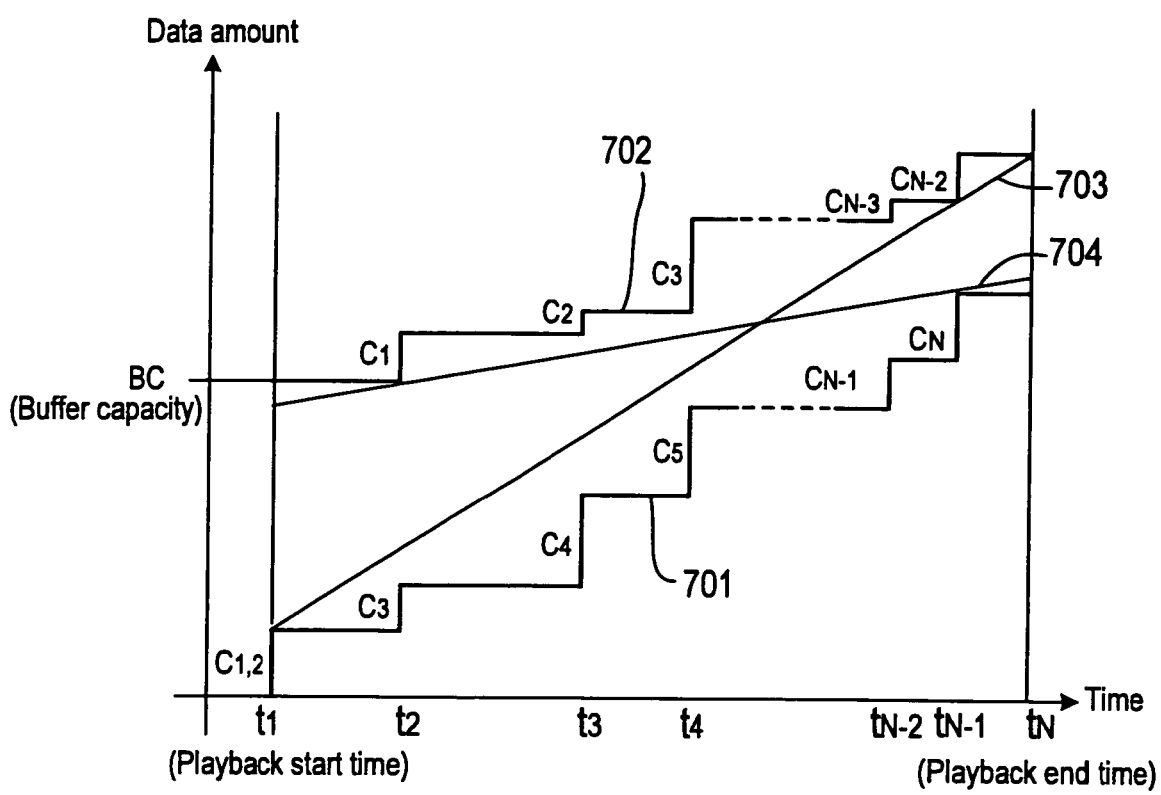
FIG. 7 is a conceptual view showing a method of determining the transmission rate by the base station in the first embodiment of the present invention.

FIG. 7 shows "total amount 404 of data required to be obtained by $t_i$" and "total amount 405 of data receivable by the wireless communication terminal by $t_{i+1}$" in FIG. 4, letting time be the horizontal axis, and the data quantity be the vertical axis.

"Total amount 404 of data required to be obtained by $t_i$" is depicted as a lower, non-linear zigzag line 701. If the wireless communication terminal has not received a total amount of data equal to or greater than the level of this line 701 at any point of time, underflow will occur.

"Total amount 405 of data receivable by the wireless communication terminal by $t_{i+1}$" is depicted as an upper, non-linear zigzag line 702. If the wireless communication terminal has received a total amount of data equal to or greater than the level of this line 702 at any point of time, overflow will occur.

Accordingly, at time t ($t_i \leq t < t_{i+1}$) the difference between lines 701 and 702 represents the buffer size available for data transmission rate.

Since the transmission rate from the base station to the wireless communication terminal is assumed to be constant, if a line that passes through the area between the zigzag lines 701 and 702 is determined, the inclination of the line is the transmission rate to be determined. In the case of this embodiment, the way in which such a line is determined is shown in FIG. 7: the maximum and minimum transmission rates that will not cause either overflow or underflow using the path between the base station and the wireless communication terminal are given by the two straight lines 703 and 704. Here, the value of the data amount at time $t_1$ represents the amount of data to be buffered by previous reception before start of play of multimedia data.

There are lots of straight lines having an inclination between those of the two lines 703 and 704, but if the amount of pre-buffered data is maximized within the limitations of the transmission rate of the path and the buffering capacity of the wireless communication terminal, the intermittent period can be optimized, being suitable for the aim of the present invention. For a similar purpose, the transmission rate is desired to be as high as possible. However, use of a high transmission rate is prone to cause congestion on the path. Therefore, if the transmission rate is maximized (or if such a modulation scheme is selected), the error rate of data transmission increases even when the communication environment and protocol provide the function of managing the communication quality to be constant as in HiSWANa. For this reason, in the present embodiment the line 704 which yields the minimum transmission rate is selected as the safe and effective method even for an environment in which propagation path conditions fluctuate greatly as by wireless. The method of determining the intermittent period under the setup condition will be described below with reference to FIG. 10.

[Securement of Transmission Band]

As the transmission rate and the amount of pre-buffering are determined by the above method, communication quality manager 103 of the wireless communication terminal, first, sends a request for securing a transmission band in data link connection to communicating means controller 108 (Steps 503, 604).

When the transmission band in the data link connection has been secured, communicating means controller 108 of the wireless communication terminal returns a confirmation response to communication quality manager 103 (Step 605). Though the specific way of securing the transmission band is beyond the scope of the present embodiment, if a communication system conforming to HiSWANa is used, the system has the function of securing the necessary band by letting the communication controllers in both the wireless communication terminal and the base station negotiate with each other, as necessary. The description of the embodiment hereinbelow is advanced on the assumption that the band has been successfully secured.

[The First Control Process (Request for Transmission of Control Information)]

Next, communication quality manager 103 of the wireless communication terminal implements the first control process (request for transmission of control information) with communication quality manager 123 of the base station (Steps 504, 606).

In the first control process, communication quality manager 123 of the base station acquires the control information on wireless communication terminal 101, including the multimedia data characteristics, data transmission rate and reception buffer capacity (amount of buffering), from communication quality manager 103 of the wireless communication terminal.

[Start of Multimedia Data Transmission]

After the first control process is completed, multimedia data receiver/player 104 of the wireless communication terminal, receives a transmission confirmation of session information from communication quality manager 103 of the wireless communication terminal (Step 607), and submits a request for start of sending multimedia data 204 to server 203 (Step 608). In the aforementioned RTSP, this request can be made by using a PLAY command.

Server 203, having received the request to start sending multimedia data 204, transmits multimedia data 204 to the wireless communication terminal by way of base station 121 (Steps 505, 609). Wireless communication terminal 101, having received the data, starts playing data in parallel with reception. Wireless communication between wireless communication terminal 101 and base station 121 at this stage is implemented in the continuous communication mode (or intermittent communication mode using a period of 2 msec).

When playback of the whole data is completed or when a session interruption is requested from wireless communication terminal 101 to server 203, the streaming session ends (Step 506).

[Power Consumption Reduction Sequence During Streaming Session]

Next, in the multimedia data transmission step (Step 505) in the streaming session shown in FIG. 5, the sequence of reducing power consumption will be described based on the flowchart shown in FIG. 8, the sequence chart shown in FIG. 9, the flowchart shown in FIG. 10 and FIGS. 11 and 12.

[Judgement to Switch the Intermittent Period]

While server 203 transmits multimedia data 204 (Steps 801, 802, 901), communication quality managers 103 and 123 of wireless communication terminal 101 and base station 121 monitor the amount of communication of the session to be the management target and judge whether the session is interrupted (Step 803).

Communicating means controllers 108 and 128 of the wireless communication terminal 101 and base station 121 monitor the amount of communication of wireless data between the wireless communication terminal and the base station and judge whether the wireless data ends (Step 803).

The communication quality managers 103 and 123 are able to know the amount of communication between wireless communicating means 107 and 127 of wireless communication terminal 101 and base station 121, through respective communicating means controllers 108 and 128.

The communication quality managers 103 and 123 determine whether a recalculation of the intermittent period should be made, from the above-mentioned amount of communication monitored during transfer of multimedia data 204, and from the data characteristics already obtained from the aforementioned sequence (Step 804). When recalculation of the intermittent period is determined to be unnecessary, operation goes to implementation of intermittent communication (Step 802).

[Reason for Recalculation of the Intermittent Period]

The cases where recalculation of the intermittent period should be made are not limited in detail by the present embodiment. However, as the first reason for recalculation of the intermittent period, there is a case, for example, where the amount of communication of the session being managed by communication quality manager 103 of the wireless communication terminal becomes lower compared to the band available for data link connection between wireless communication terminal 101 and base station 121. In this case, there is a possibility that the transmission rest time in the intermittent period can be increased by execution of recalculation.

As the second reason for recalculation of the intermittent period, a case can be considered in which there is a discrepancy between the amount of communication being actually observed and the previously acquired data characteristics. In this case, the first control process is activated so as to acquire the latest information as to transmission control from the communication quality manager on the partner side, thereafter a recalculation is implemented.

Further, as the third reason for recalculation of the intermittent period, when the amount of data as to the data characteristics shown in FIG. 4 is extremely large, the operation may be performed such that one frame is divided into a plurality of sections in the order of time t and the data characteristics as to the next frame are transmitted only when it becomes necessary. Also in this case, one communication quality manager activates the first control process so as to acquire the updated information as to transmission control (e.g., the multimedia data characteristics, data transmission rate and reception buffer capacity (amount of buffering), from the communication quality manager on the opposite side, thereafter re-calculate of the intermittent period is implemented.

[Setup of the Intermittent Period]

Figure 10:
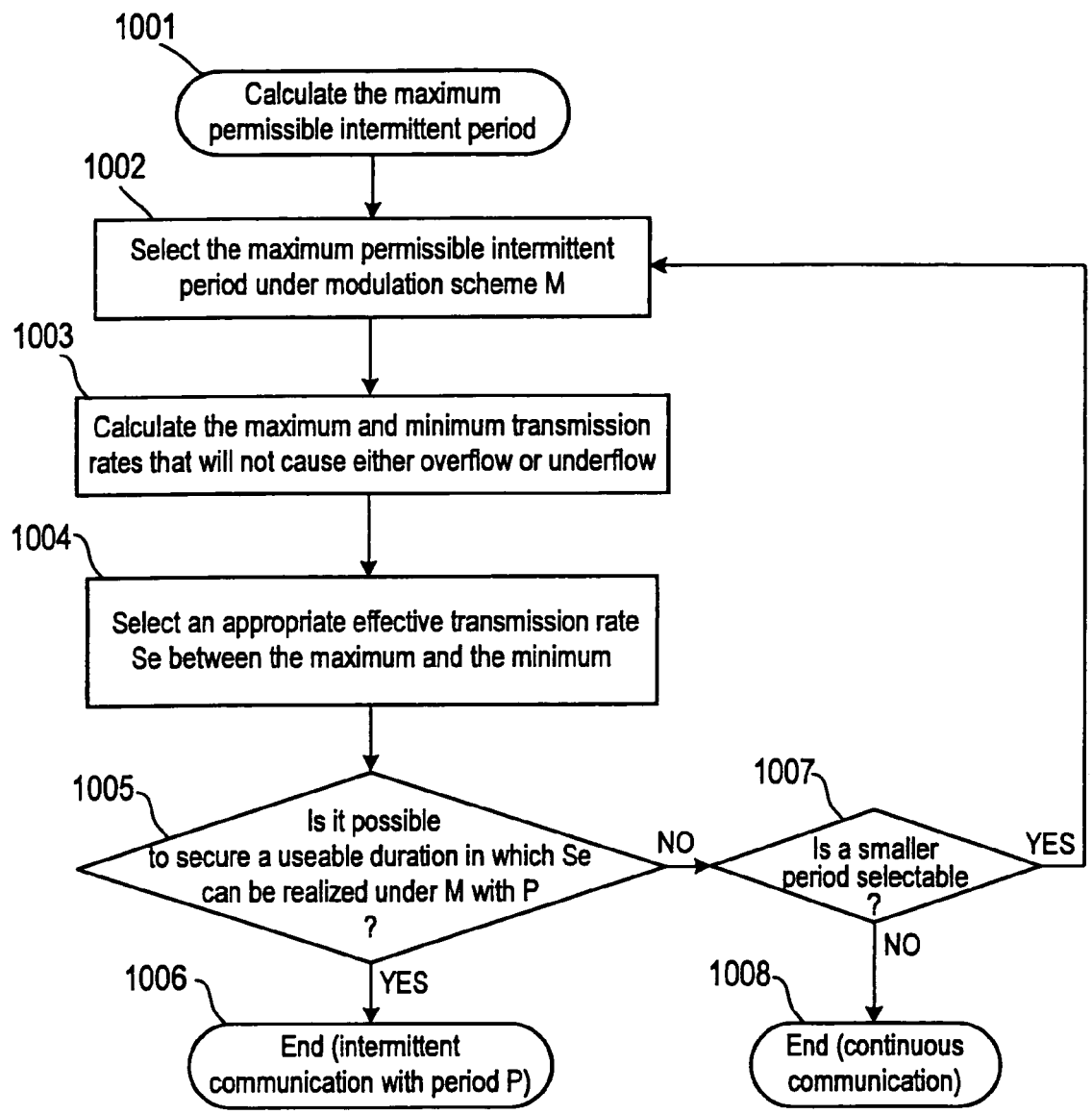
FIG. 10 is a flowchart showing a calculation process of an intermittent period in FIG. 7.

If it is determined at Step 804 that recalculation is needed, the maximum permissible intermittent period is calculated (Step 805) in accordance with the sequential steps of an aftermentioned flowchart shown in FIG. 10.

In the calculation of the applicable, maximum intermittent period, the maximum intermittent period with which data not yet transmitted can be transmitted without causing any overflow or underflow in reception buffer 105 of wireless communication terminal 101 is determined. Details of the calculation of the maximum intermittent period will be described later.

[Comparison in Intermittent Period]

The communication quality manager that implemented recalculation compares the rest time of the recalculated intermittent period with that of the current intermittent period. If the new intermittent period is longer than the current one, the manager determines that the operation should be shifted to another intermittent communication mode having a longer intermittent period (Step 806). Conversely, when the recalculated intermittent period is shorter than the current one, the manager determines that the operation should be shifted to another intermittent communication mode having a shorter intermittent period (Step 806).

[Negotiations about Intermittent Period]

If it has been judged at Step 806 that the operation should be shifted to another intermittent period mode, either the communication quality manager (103 or 123) of the wireless communication terminal or the base station, which made that judgement activates the second control process (the second negotiation process) for the partner's communication quality manager (Step 807, 902) and makes a proposal of a transition to an intermittent communication mode (transmission schedule) having a new intermittent period.

Here, in the present embodiment, either of the communication quality managers 103 and 123 can activate the second control process to the communication quality manager on the partner's side. (Also in the HiSWANa standard, if a receiving node in an intermittent communication mode attempts to start transmission by activation of the second control process or the like, the intermittent communication mode is cancelled and switched into the continuous communication mode so as to permit transmission). When the second control process is activated on the base station side, the speed of data propagating to the wireless communication terminal is estimated based on the schedule of data transmission from the base station to the wireless communication terminal. The difference between the two is that the judgement at the wireless communication terminal is likely to make a more accurate judgment based on the actual data because the actual propagating speed may differ from the transmission schedule on the base station side due to possible occurrence of jitter etc., depending on the conditions of the transmission path.

Here, it is assumed that the second control process is activated by communication quality manager 103 on the terminal side. The communication quality manager 123 of the base station, when receiving a proposal for change of the intermittent period (alternation of transmission schedule), implements the calculation process of the maximum permissible intermittent period, shown in FIG. 10 below, in the same manner as in communication quality manager 103 of the wireless communication terminal, to calculate the maximum permissible intermittent period (Step 807).

If the period calculated by the communication quality manager 123 is equal to the period proposed by communication quality manager 103 on the terminal side, the base station approves the proposal. If it is equal to the current period, the station side rejects the proposal. If it is a value otherwise, the base station proposes an amendment. When an amendment has been proposed, the calculation sequence of the maximum intermittent period is repeated until a response otherwise is returned, meaning that the second control process will end when the proposal side (communication quality manager 103 on the terminal side) receives an approval or rejection response (Steps 808, 902).

As already stated, in the present embodiment data transmission is implemented in only one MAC frame (2 msec) for each period in an intermittent communication mode. This means that data transmission time is shorter in a longer period mode than in a shorter period mode. Therefore, in the amendment case, a shorter period than the proposed period will be returned because, if otherwise, the entire band including sessions other than streaming between the wireless communication terminal and the base station could not be maintained or underflow would be prone to occur at the wireless communication terminal.

When the aftermentioned sequence of calculation shown in FIG. 10 is executed in communication quality manager 123 on the base station side, use of the same sequence enables calculation of the maximum intermittent period that allows data not yet transmitted to be transmitted without causing any overflow or underflow of the buffer in the base station. Specifically, the inclination of the interpolating straight line of the lower zigzag line in FIG. 12 roughly corresponds to "the rate at which data becomes used in the wireless communication terminal" whereas the inclination of the interpolating straight line of the upper zigzag line roughly corresponds to "the rate at which the wireless communication terminal receives data from the base station". Instead of these straight lines, "the rate at which the base station sends out data to the wireless communication terminal" and "the rate at which the base station receives data from the server" are used to implement the procedures at Step 1003 shown in FIG. 10 as described later, whereby it is possible to determine the maximum intermittent period that allows the base station to relay data from the server without causing any overflow or underflow. It should be added, however, that since base station 121 is generally provided with ample resources (memory and secondary storage capacities, CPU processing speed) compared to wireless communication terminal 101, nonoccurrence of overflow or underflow in the base station can, in most cases, be determined before implementation if a sufficient amount of buffering is effected in the base station with an appropriate transmission rate selected for data transfer from the server to the base station.

The object of the second control process (the second negotiation process) resides in that when either of the communication quality managers on the transmitting and receiving sides has detected change of the transmission environment through the management of communication quality, the rest time in intermittent communication is reduced if required when the environment has degraded while the rest time in intermittent communication is increased if possible when the environment has improved. Therefore, recalculation itself may be implemented on either the transmitting side or the receiving side as long as the required information (namely, the total amount of reception, the usable amount of buffer and the reception error rate at a certain point of time on the receiving side, the data characteristics representing the total amount of data and the elapsed time to be transmitted may be assumed) for the recalculation process is available.

For example, in the above example, the communication quality manager of the wireless communication terminal, having activated the second control process, instead of performing recalculation by itself, may send the information, required for the recalculation process but not present in the base station (the total amount of reception, the usable amount of buffer and the reception error rate at a certain point of time on the terminal side, in this case), to the base station and then request for recalculation to the base station side. Thereafter, the terminal side is able to accept the updated period that was calculated by the base station side, without any negotiation since the information sent from the terminal is the latest. This scheme is particularly effective when the calculation processing performance of the base station is much superior to that of the terminal.

In sum, the second control process can be divided into two processes, i.e., the process of sharing the necessary information for recalculation and the process of recalculation of a new intermittent period and negotiation, of which, each can also be done individually and independently. The second embodiment described hereinbelow, will present a method in which the former process, i.e., the sharing process has been done before activation of the second control process, and a new intermittent process is recalculated referring to the information that is shared at the activation of the second control process and negotiations are made.

Further, when both sides have shared the necessary information for recalculation first, then the operation in the continuous communication mode is started without implementation of intermittent period calculation and negotiations immediately after the start of a session, the first control means can not be differentiated from a special case of the second control process.

[Detailed Process of Maximum Intermittent Period Calculation]

Referring next to the flowchart shown in FIG. 10, the process (Step 1001 (805, 807)) in which communication quality manager 103 of wireless communication terminal 101 or communication quality manager 123 of base station 121 calculates the maximum permissible intermittent period will be described.

To begin with, a predetermined modulating scheme M is selected from modulation schemes 302, 303 and 304 shown in FIG. 3, and the maximum period P is selected from a number of periods in 301 (Step 1002). Here, modulation scheme M and period P need to be selected so as to maintain the current transmission rate between the base station and the wireless communication terminal.

Next, the maximum and minimum transmission rates at which neither overflow nor underflow will occur between the base station and the wireless communication terminal in intermittent communication mode are determined (Step 1003).

The way the maximum and minimum transmission rates are determined is basically similar to the method for the continuous communication mode described with reference to FIG. 7. In this case, the relationship between the elapsed time and the amount of transfer data in the intermittent communication mode is represented by a non-linear zigzag line graph 1101 shown in FIG. 11. In the present embodiment, since, in intermittent communication mode, data is transmitted in one MAC frame section 1103 only within each period 1102, the amount of transfer data does not increase in the other section 1104 (period 1102-section 1103). It is therefore necessary to show that the zigzag line 1101 of FIG. 11 will not cause any overflow and underflow. As a simple approximation, it is sufficient if it is shown that both the upper side 1105a and lower side 1105b of a parallelogram 1105 that externally touches this zigzag line 1101, shown by a broken line, do not cause any overflow and underflow.

In FIG. 12, at start time $T_1$ of an intermittent communication having a new period, among the parallelograms drawn between a zigzag line 1203 that represents the total amount of data needed to be acquired by time $t_i$ and another zigzag line 1204 that represents the total amount of data receivable by the wireless communication terminal by time $t_{i+1}$, the inclination of top and bottom sides 1206, whose inclination is maximum and the inclination of top and bottom sides 1207, whose inclination is minimum, represent the maximum and minimum transmission rates to be searched for. Here, a solid line 1205 shows the relationship of the transmission rate of the intermittent period before the above-described recalculation.

Here, height 1208 of the parallelogram is determined by the amount of transmission per period, which is determined by the intermittent period P and modulation scheme M and the time during which transmission is activated in one period. The point that this height 1208 is determined depending on the period can be one of the features of the present embodiment. Here, in the embodiment, since start time $T_1$ is uncertain at the start time (tnego) of the second control process, start time $T_1$ and the maximum and minimum rates should be selected in the case of this embodiment, by appropriately estimating the difference between the two.

Once the rate range in which no overflow or underflow will occur is obtained, an appropriate effective transmission rate Se in the middle of the range is selected (Step 1004).

The communication quality manager, if necessary, can refer to the communicating means controller to determine whether the target streaming session is able to fill up the communication duration in which the rate Se is realized under the modulation scheme M with intermittent period P (Step 1005). If possible, this period P is the maximum period to be searched for (Step 1006). If impossible, it is judged whether a shorter intermittent period can be selected, based on the table shown in FIG. 3 (Step 1007). If selection is possible, the period and the selectable modulation scheme are determined to be the revised modulation scheme M and period P, and recalculation is implemented. Since the period will become minimum, at some point, the calculation will inevitably end (Step 1008). In this case, the operation needs to be executed in the continuous communication mode.

[Start of a Revised Intermittent Period]

Figure 8:
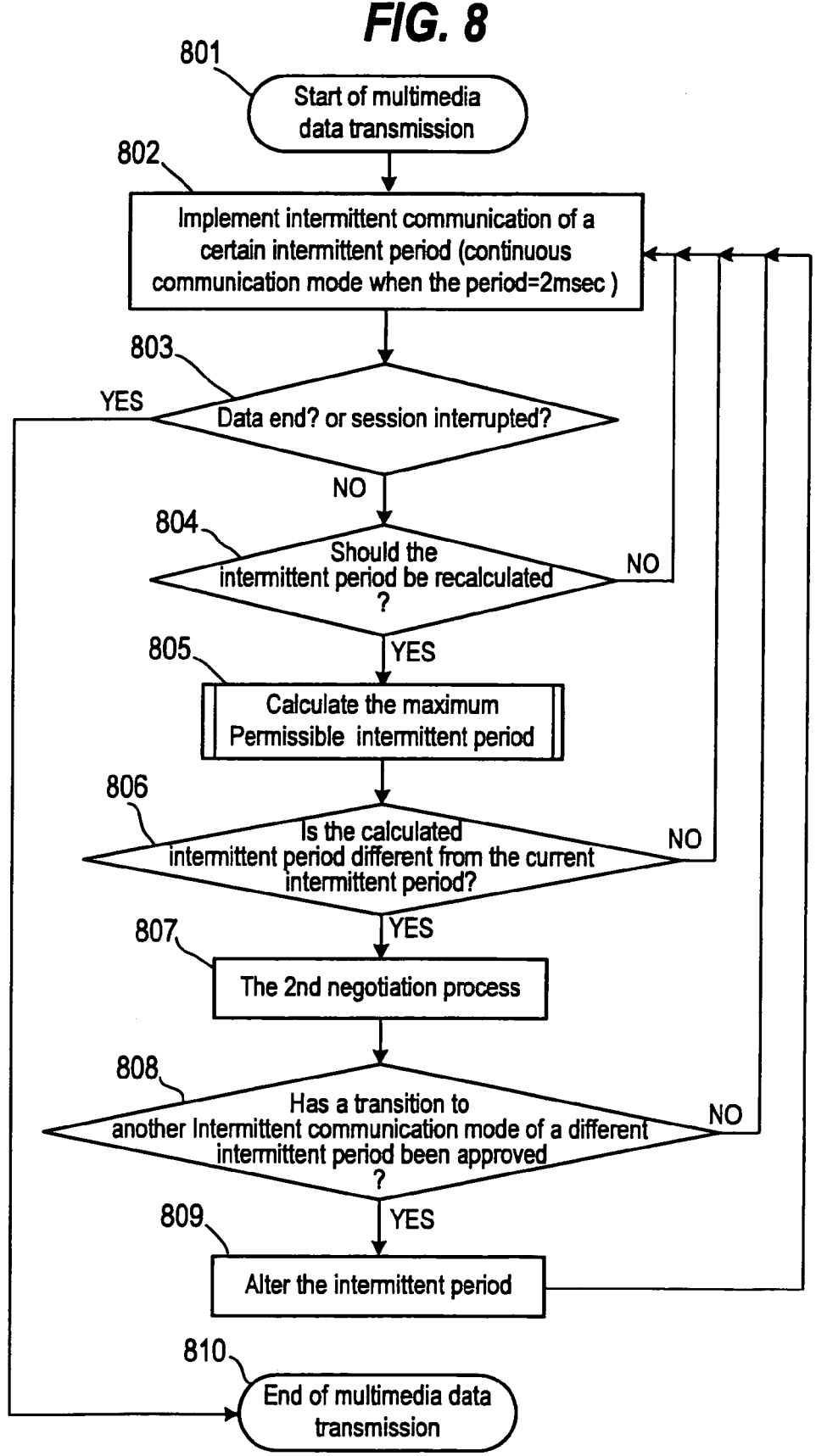
FIG. 8 is a flowchart showing the sequential steps of a streaming session in the first embodiment of the present invention shifting to an intermittent communication mode having a different period.
Figure 9:
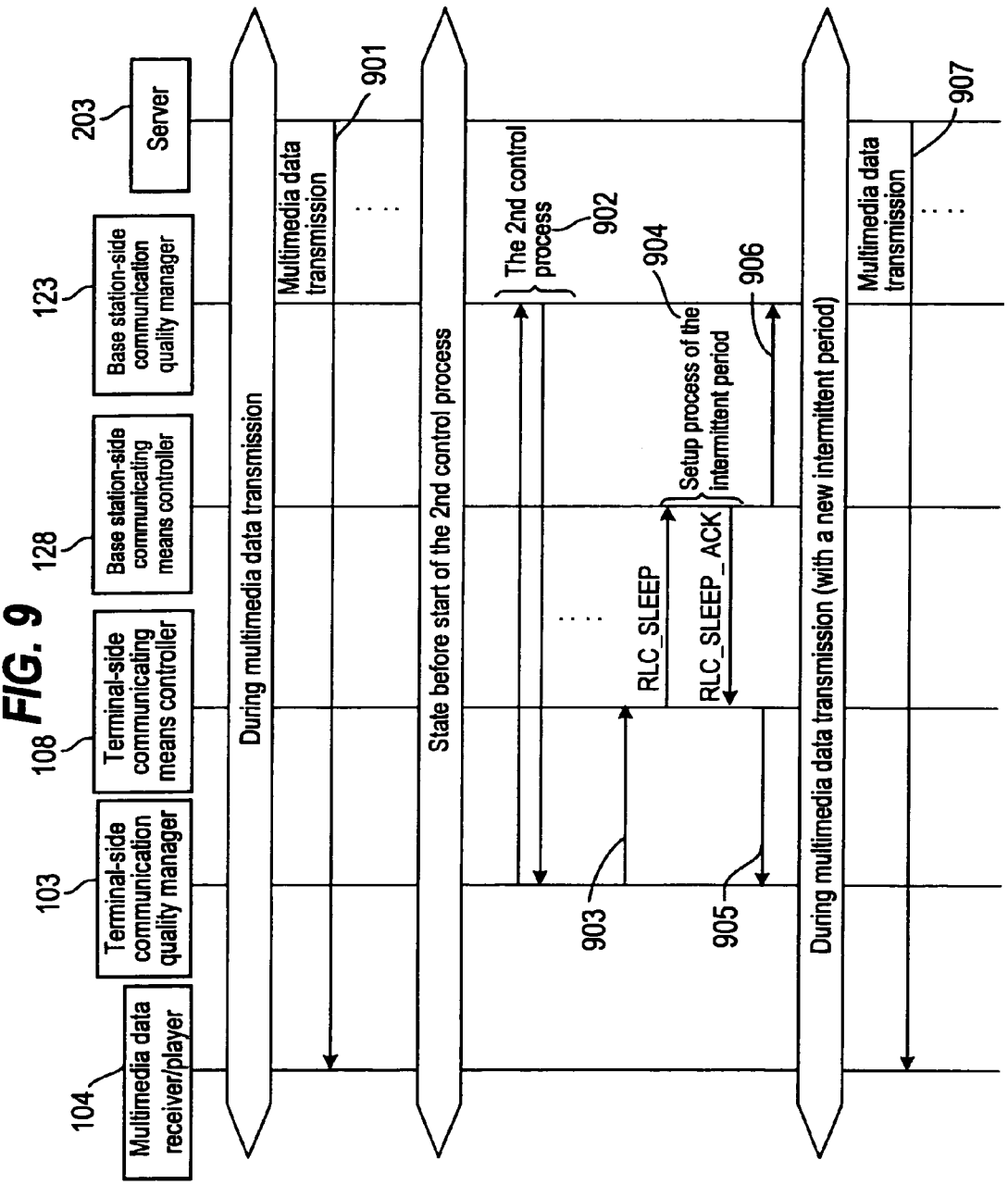
FIG. 9 is a sequence chart showing the sequential steps of a streaming session in the first embodiment of the present invention shifting to an intermittent communication mode having a different period.

Next, returning to the process shown in FIG. 8, when the intermittent mode to which the operation is shifted is approved (Step 808), the communication quality manager on the node that made a proposal alters the intermittent period (Step 809). For this purpose, a request for transition to the intermittent communication mode (transmission schedule) using the approved new period is made to the communicating means controller of its own (Step 903). Since the communicating means in the present embodiment conforms to HiSWANa, communicating means controller 108 on the terminal side transmits a proposal of the intermittent period after mode transition by a messageRLC_SLEEP (Step 904). The communicating means controller 128 of the base station having received the proposal, returns to communicating means controller 108 on the terminal side, the judgment result of whether a transition to the intermittent communication mode is allowed, and the intermittent period and the start time for transmission schedule after transition, if the transition is allowed (Step 904).

Herein, a change of the intermittent period means alteration of the amount of data transmission in the intermittent period. That is, the change of the intermittent period means alteration of the time interval between transmissions (time interval between inactions) and/or the amount of data transmission. However, the change may mean the information capable of producing the same result, e.g., the alteration of transmission rate or modulation scheme (encoding rate).

Since the aforementioned HiSWANa is a TDMA/TDD scheme, the wireless communication terminal and base station transit to the intermittent communication mode simultaneously at the start time and can continue the communication thereafter, keeping synchronization (Step 907). The knowledge of whether transition to a new intermittent communication mode has been made and the intermittent period and the start time if transition was allowed, is given from the communicating means controller to the communication quality manager in each node (Steps 905 and 906) for future control of transmission.

Figure 13:
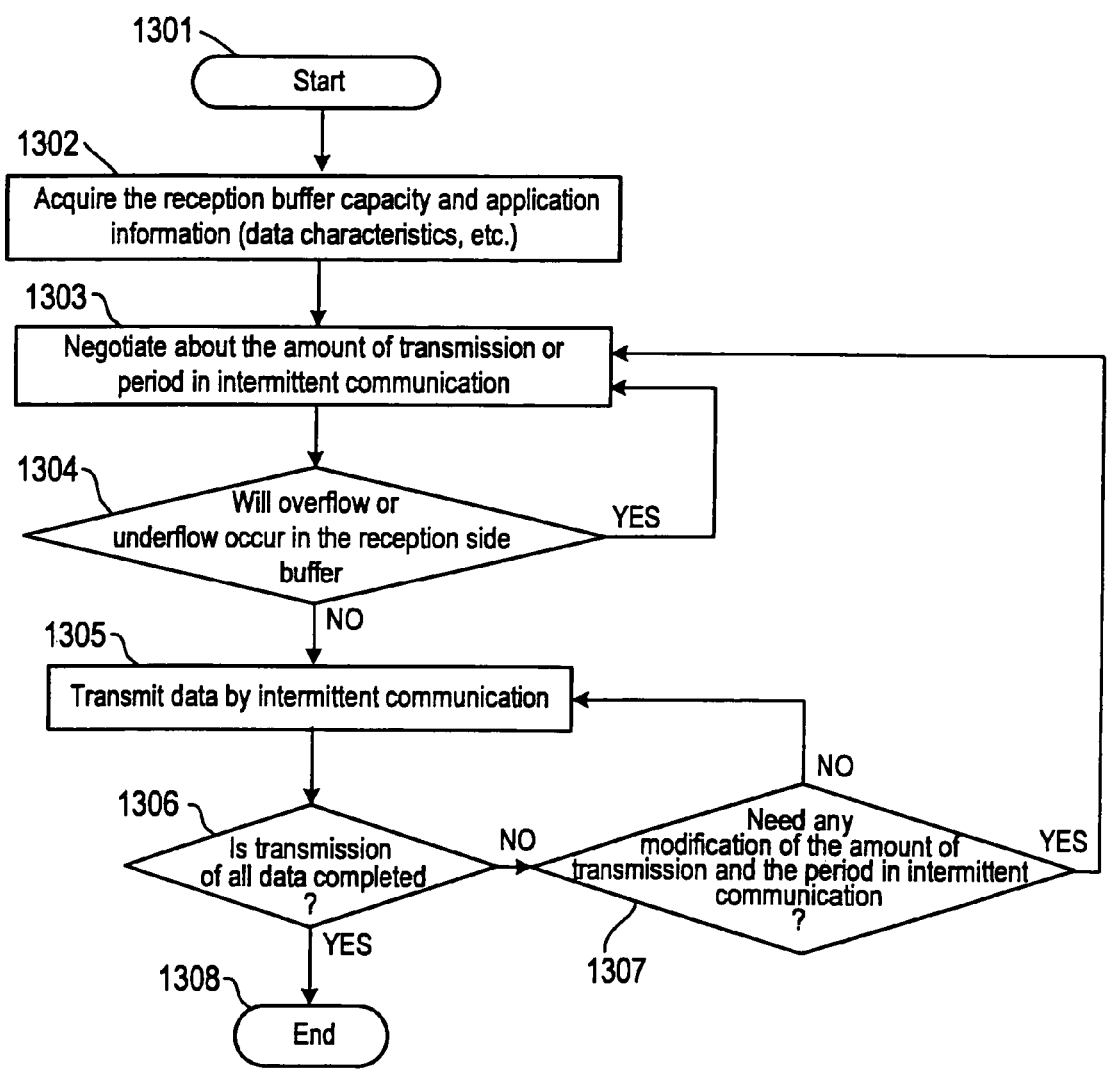
FIG. 13 is a flowchart showing the sequential steps of a wireless transmission and reception system according to the first embodiment of the present invention.

FIG. 13 shows a flowchart presenting an outline of the above intermittent communication of the present embodiment. Specifically, first, the communication quality manager on the terminal side acquires the reception buffer capacity and the information (data characteristics, etc.) to be processed in the application layer (Step 1302). The terminal, the base station and the like conduct negotiations as to the amount of transmission or the period in intermittent communication (Step 1303). It is judged whether any overflow or underflow on the receiving side buffer will occur (Step 1304). If not, data transmission by intermittent communication is started (Step 1305). If overflow or the like occurs, the operation returns to Step 1303. At Step 1306, whether transmission of the whole data is completed is judged. If not, it is judged whether some modification of the amount of transmission and the period of intermittent communication should be added (Step 1307). If modification is made, the operation goes to Step 1303. If no modification is needed, the operation goes to Step 1305 and continues transmission of data.

In the above configuration, the operation in the intermittent communication mode is repeated every period in such a manner that, in FIG. 1, communicating means controller 128 of base station 121 starts data transmission from base station 121 to wireless communication terminal 101 at the start time of each period and stops relaying the data from the server to the wireless communication terminal 101 when a predetermined amount of transmission in one period has been send out and until the next period begins.

Communicating means controller 108 of wireless communication terminal 101, when the operation transits to an intermittent communication mode, informs the power supply controller 111 of the transition. In the intermittent communication mode, power supply controller 111 stops power supply to wireless communicator 110 after the end of data transmission from base station 121 to wireless communication terminal 101 in one period until the start of the next period.

Thus, according to the procedures described heretofore, when streaming is performed in a wireless communication terminal, the maximum intermittent communication period that will not cause either overflow or underflow in the reception buffer of the wireless communication terminal is calculated so that the operation is transferred to the intermittent communication mode based on that period, whereby it is possible to reduce power consumption of the wireless communication process.

While, in the aforementioned streaming system using the first prior art, the operation does not transit to intermittent communication mode, in the streaming system constructed by the wireless transmission and reception system (e.g., FIG. 13) according to the present embodiment, it is possible to positively promote a transition into intermittent communication mode, if possible, by the control process described above.

Also, the aforementioned data communication system using the second prior art does not use information as to a higher-ranked application to calculate the intermittent period. However, in the streaming system constructed by the wireless transmission and reception system according to the present embodiment, it is possible to avoid overflow and underflow of the buffer in the wireless communication terminal in which playing is performed, by making use of the data characteristics of the application in calculating the amount of data transmission per intermittent period and the time interval of intermittent periods when the operation is transferred into intermittent communication mode.

Though it is assumed in the present embodiment that only a single wireless communication terminal is engaged, a plurality of wireless communication terminals may be handled as shown in FIG. 2 if the communication system is adapted to support a one-to-many communication (multicast) configuration, as in HiSWANa. In this case, after the communication between one wireless communication terminal and the base station has entered into an intermittent mode by the second control process, the base station can present, by activation of the second control process, an intermittent period to another wireless communication terminal, thus making it possible to make remaining wireless communication terminals, one by one, transit into intermittent mode.

The Second Embodiment

In the above description of the communication quality manager, explanation was made mainly focusing on its operation. Next, its specific configuration will be described as the second embodiment with reference to FIG. 14. Here, the same components are allotted with the same reference numerals and their detailed description is omitted.

Figure 14:
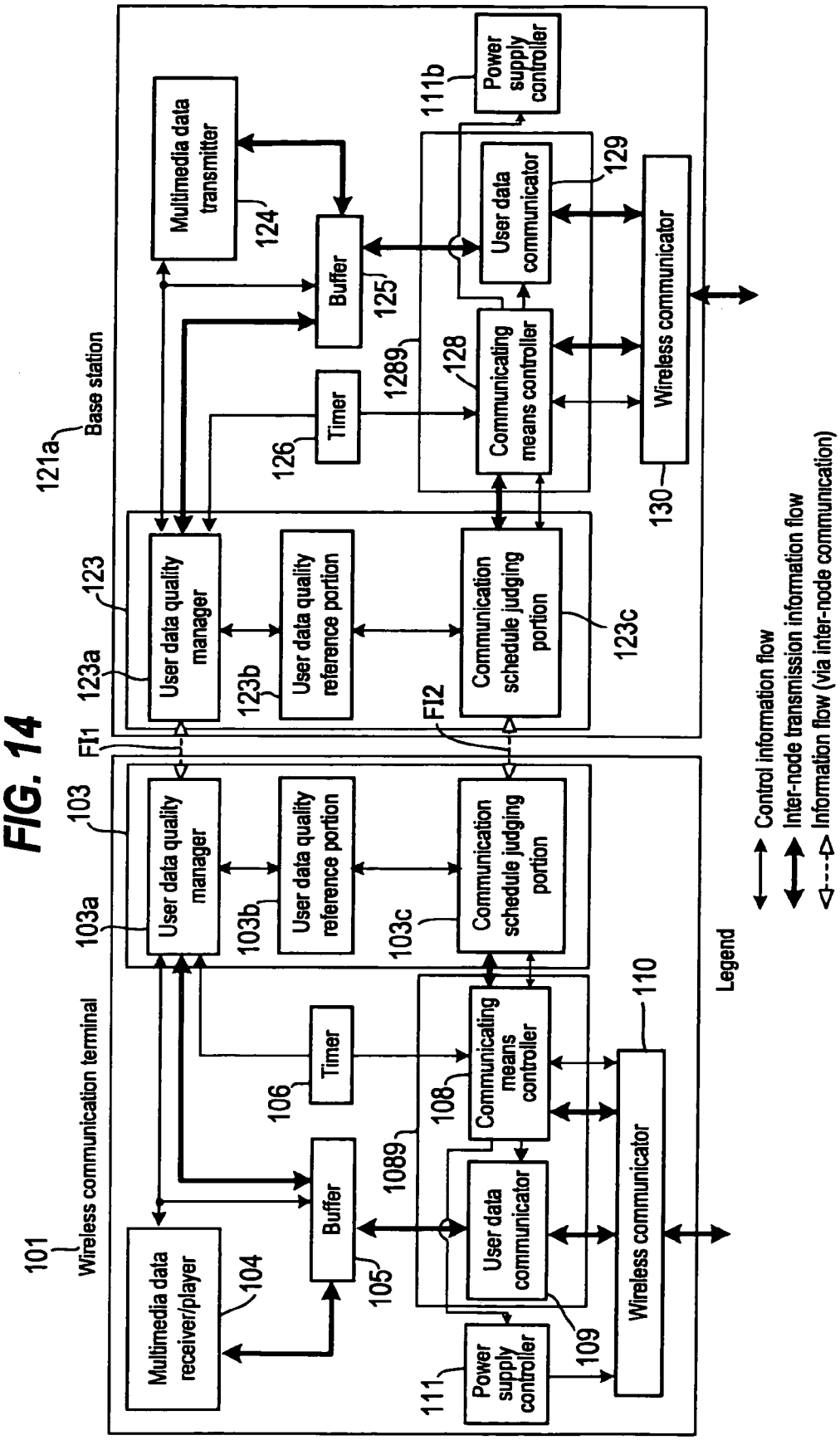
FIG. 14 is a block diagram showing schematic configurations of a wireless communication terminal and a base station for realizing a wireless transmission and reception system according to the second embodiment of the present invention.

FIG. 14 shows a configuration based on the OSI 7-layer model. In the drawing, the data link layer of the OSI 7-layer model and its higher-ranked layers are separately depicted from bottom to top. In the present embodiment, a combination of the transport layer, session layer, presentation layer and application layer of the OSI 7-layer model is called application, hereinbelow. This grouping follows the usual practice in which the above four layers (though there are cases in which the transport layer is not included) are generally handled without separation in a system realized using the widespread TCP/IP protocol. Also, the communicating means controller 108 and user data communicator 109 are put together and named inter-node communicator 1089 and the communicating means controller 128 and user data communicator 129 are put together and named inter-node communicator 1289, taking into account that they belong to the same layer on the OSI 7-layer model.

Further, it is assumed in the present second embodiment that a plurality of entities of the multimedia data receiver/player 104 and multimedia data transmitter 124 are provided. That is, the above first embodiment was described taking an example including only a single multimedia data receiver/player 104 and a single multimedia data transmitter 124, for description convenience.

However, multimedia data receiver/player 104 represents an application process, hence there are cases where a plurality of processing entities (entities and processes) using one data transmission service in the data link layer operate in parallel. Similarly, there are cases where a plurality of multimedia data transmitters 124 as processing entities using one data transmission service in the data link layer operate in parallel. Accordingly, in the present embodiment, aftermentioned user data quality manager 103a, 123a of communication quality manager 103, 123 will control the quality relating to the traffic of a plurality of user data (multimedia data).

Also, a power supply controller 111b is provided for the base station side so as to enable reduction of power consumption by intermittent communication on the base station side.

[Communication Quality Manager]

Communication quality manager 103, 123 in FIG. 14 includes: a user data quality manager 103a, 123a for managing application information dependent on individual applications; a communication schedule judging portion 103c, 123c for setting up, judging, and negotiating of, a data transmission schedule on an intermittent communication basis, of all the processes of the node; and a user data quality referring portion 103b, 123b for exchange of information between the user data quality manager and the communication schedule judging portion.

[User Data Quality Manager]

User data quality manager 103a, 123a acquires by way of inter-node communicator 1089, 1289 and holds pieces of application information FI1 relating to individual applications for playing multimedia data (user data) stored in buffer 105 in real-time by multimedia data receiver/player 104.

This application information FI1 includes: the data characteristics of the user data transferred between user data quality managers 103a and 123a; the buffer capacity usable on the reception side; reception error information QoS corresponding to the error rate of user data, inclusive of failure of user data to satisfy the actual time requirement relating to the data characteristics (total amount of communication data to meet the communication time), and others.

The application information FI1 is the information referred to by communication schedule judging portion 103c, 123c when it sets up, judges, and makes negotiations of a data transmission schedule, described later, and is also called user data quality management information.

The user data quality management information, as described in the first embodiment, includes the multimedia data characteristics (FIG. 4), inclusive of requested bands for multimedia data, and the average transmission rates (FIG. 3) in the path, affordable by the whole transmission path between the wireless communication terminal and the server.

Concerning these pieces of user data quality management information, it is assumed that both the terminal and the base station hold equivalent information, as already mentioned. For this purpose, user data quality managers 103a and 123a of the terminal and the base station share these pieces of data, synchronized, by communicating with each other, using inter-node communicators 1089 and 1289, if required. Also the information on the data characteristics and the buffer capacity usable on the receiver side can be synchronized in the same manner as in the first embodiment. As to reception error information QoS, it can be fed back from the reception user data quality manager to transmission user data quality manager in the same manner. When the transmission source of the user data in the upper layer coincides with 121a, feedback can be done using RTCP (RFC1889) as the first prior art.

[User Data Quality Reference Portion]

User data quality reference portion 103b, 123b is directly connected to user data quality manager 103a, 123a and communication schedule judging portion 103c, 123c, respectively, and can be constituted of an information transfer path for enabling the user data quality management information required for the aforementioned process at the communication schedule judging portion to be transferred from user data quality manager 103a, 123a to communication schedule judging portion 103c, 123c, a storage area for storing user data quality management information, a processor capable of implementing setup, judgement and other processes, based on user data quality management information, or the like.

[Communication Schedule Judging Portion]

Communication schedule judging portion 103c, 123c implements setup, judgement and negotiations of the data transmission schedule based on user data quality management information and the like. The data transmission schedule includes information on the transmission rate, modulation type, intermittent period and others. Specifically, the following process as described in the first embodiment is implemented.

That is, communication schedule judging portion 103c, 123c, at the beginning of streaming, calculates, based on any of the user data quality management information, the data transmission rate at which data is transmitted from base station 121a to wireless communication terminal 101, and the amount of buffering, i.e., the amount of data to be pre-buffered in reception buffer 105 of wireless communication terminal 101 from the start of transmission to the start of playing.

Further, communication schedule judging portion 103c, 123c makes a request for securing a transmission band to communicating means controller 108 at Steps 509 and 604 and implements the first control process at Step 606.

Also, communication schedule judging portion 103c, 123c monitors the amount of communication between wireless communication terminal 101 and base station 121a by way of communicating means controller 108, 128, and judges whether the session is interrupted, at Step 803.

Moreover, communication schedule judging portion 103c, 123c implements setup, judgement, and negotiations, of the transmission schedule relating to the whole station, based on the user data quality management information at Steps 805 to 807. Accordingly, as the second control process (the second negotiation process) at Steps 807 and 902 is activated, information FI2 such as a new intermittent period, etc., is exchanged between communication schedule judging portions 103c and 123c, as shown in FIG. 14.

[Reason for Recalculation of the Transmission Schedule]

The trigger for transition to a new intermittent communication mode at Step 804 may be given either by the application of user data quality manager 103a or 123a or from the data link layer such as communication schedule judging portion 103c, 123c, etc.

For example, when user data quality manager 103a, 123a detects increase in transmission error rate based on the reception error information QoS of application information FI1, it transfers the detection to communication schedule judging portion 103c, 123c, by way of user data quality reference portion 103b, 123b.

Communication schedule judging portion 103c, 123c, having received a notice of increase in error rate and the like, is triggered by the notice to start trying to set up a transmission schedule having a modulation scheme M and the maximum permissible rest time in intermittent communication, in the same manner as in the process of FIG. 10. As the error rate increases, transition to a modulation scheme M having a greater error tolerance is attempted. In general, however, the transmission rate decreases as error tolerance becomes greater, so that there is a possibility that the rest time in intermittent communication cannot be taken as long as the rest time before transition. In this case, the communication schedule judging portion, similarly to the negotiating process (FIGS. 8, 9 and 13), is able to start a negotiating process with the communication schedule judging portion of the communication partner so as to propose the use of a newly set up transmission schedule.

Also, when detecting that the traffic between the nodes has become lower than the usable band, communication schedule judging portion 103c, 123c, triggered by this detection result, starts setting up a new transmission schedule between the nodes. If an intermittent period that permits a longer rest time is obtained by this setup, the communication schedule judging portion starts a negotiation process as in the first embodiment (FIGS. 8, 9 and 13) with the communication schedule judging portion of the communication partner, in order to propose the use of the newly set up transmission schedule.

The negotiation process of a transmission schedule is a process of negotiations relating to inter-node communication, and is executed by exchange of pieces of information as to control in the data link layer between communication schedule judging portions 103c and 123c. Accordingly, these pieces of control information may depend on the specifications of the data link layer. Since in the present embodiment a data link layer substantially conforming to HiSWANa is used, the transmission rate is decided depending on the setting of the data link connection, and the control information to be exchanged consists of a new intermittent period P and time $T_1$ at which communication with the period P starts. When the aforementioned 802.11, 802.11e, third-generation cellular phones and other communication systems are used, different kinds of information may or should be exchanged.

[Method of Acquisition of User Data Quality Management Information by the Judgement Communication Schedule Judging Portion]

Acquisition of user data quality management information by judgement communication schedule judging portion 103c, 123c may be done by either direct acquisition through the user data quality information reference portion or by indirect method instead of getting hold of user data quality management information itself.

In the case of direct acquisition, the communication schedule judging means acquires pieces of user data quality management information relating to all of user data traffics from the user data quality managing means, by way of the user data quality information reference means. The communication schedule judging means that has obtained the user data quality management information, judges the suitability of the transmission schedule in the same judging method as that shown in FIG. 12 of the first embodiment. Upon the judgement, the total amount of communication at the node, i.e., the traffic information that is obtained by summing all pieces of obtained user data quality management information, is used instead of the information on a single user data traffic. The communication schedule judging means uses this judging method when it sets up a candidate communication schedule or it judges the suitability of the transmission schedule proposed by the communication partner in the negotiation process.

In the case of indirect acquisition, communication schedule judging portion 103c, 123c presents a transmission schedule to user data quality information reference portion 103b, 123b, and requests a judgement on the suitability of the transmission schedule. The user data quality information reference portion 103b, 123b that has received the request, gets the user data quality management information relating to user data traffic, from user data quality information manager 103a, 123a, and determines the suitability of the schedule based on the judging method shown in FIG. 12, and returns the judgement result alone to communication schedule judging portion 103c, 123c. Here, when it is determined to be unsuitable, user data quality information reference portion 103b, 123b reports individual user traffics or the summation of total user traffics and the discrepancy (difference) from the transmission schedule that was determined to be unsuitable, to communication schedule judging portion 103c, 123c. Communication schedule judging portion 103c, 123c, based on the report, proposes a revised transmission schedule to user data quality information reference portion 103b, 123b.

[Timing at which the Communication Schedule Judging Portion Acquires User Data Quality Information]

Acquisition of user data quality information by the communication schedule judging portion through the user data quality reference portion can be done when necessary. For example, when the aforementioned user data quality manager causes the communication schedule judging portion to start a transition process into a new intermittent communication mode by way of the user data quality reference portion, user data quality information may be given at the same time. Other than this, it is also possible to periodically provide user data quality information from user data quality manager to communication schedule judging portion. Alternatively, when one communication schedule judging portion is proposed the use of a new transmission schedule by the communication schedule judging portion on the communication partner side, it can acquire user data quality information through the user data quality information reference portion if it does not have the necessary user data quality information for judgement or if the data at hand is determined to be outdated.

[Correspondence to the OSI 7-layer Model]

Next, correspondence of individual components to the OSI 7-layer model will be described.

Wireless communicators 110 and 130 as the physical means for communications correspond to the physical layer of the OSI 7-layer model, and govern the communications between the nodes. Inter-node communicators 1089 and 1289 for providing transmission service between the two nodes correspond to the data link layer of the OSI 7-layer model.

Similarly, judgement as to a communication schedule of intermittent communication is a process that controls inter-node communication, so that communication schedule judging portions 103c and 123c for conducting this judgement constitutes part of the function of the data link layer.

Multimedia data receiver/player 104 and multimedia data transmitter 124 conduct application processes of multimedia data, and correspond to the application (meaning the layers including the transport layer and the layers above, herein).

Similarly, user data quality managers 103a and 123a manage the quality of data transmitted or received by applications, hence correspond to the application.

It should be noted that user data quality reference portions 103b and 123b correspond to the interface between the data link layer and the application, and which layer they belong to depends on the actual configuration. It should be also noted that no functional block corresponding to the network layer is depicted.

As has been described, in the present embodiment, since provision of user data quality reference portions 103b, 123b allows communication schedule judging portions 103c and 123c to directly or indirectly acquire and use user data quality management information from user data quality manager 103a, 123a when they conduct setup, judgement and negotiations of a data transmission schedule of intermittent communication, it is possible to change the intermittent period during streaming playback without causing any buffer overflow and underflow on the receiving side. Accordingly, it is possible to stop power supply to the wireless communicator during streaming playback, hence achieve effective reduction of power consumption.

On the contrary, the first and second prior art technologies have no information transfer path that transfers user data quality management information to the data link layer, in terms of the OSI 7-layer model, from the layers above. The reason is that in the OSI 7-layer model, a lower layer is aimed at providing services that do not depend on the layers above. Accordingly, the aforementioned first and second prior art technologies do not have any means for acquiring application information FI1 by the configuration of the data link layer and the layers below.

Further, in the present embodiment, since power supply controller 111b is also provided for the base station side, it is also possible to reduce power consumption by use of intermittent communication on the base station side. In the present embodiment, the base station side is not limited to base station 121a, but the same operational effect can be obtained as long as it is a transmitter.

[Program, Storage Medium]

By installing the program for implementing the processes of the wireless transmission and reception systems described in the above first and second embodiments on a terminal (receiver) and a base station (transmitter) in the terminal (receiver) and the base station (transmitter) using a storage medium, it is possible to realize reduction of power consumption with a simple manner.

The installation method is not limited, and it is possible to install the program in a simple manner by recording the program on a recording medium and installing it on a terminal (receiver) and a base station (transmitter) via the recording medium. The recording medium is not limited. For example, semiconductor memories, rotary read types (including MD, CD, magnetic dick, magneto-optical disk, etc.) can be used for convenience.

Incidentally, if some information of the aforementioned user data quality management information is obtained from the surrounding environment, it is possible to omit the acquisition of such user data quality management information. If the coding scheme adopted by the transmission service is known to be, for example, MPEG-2 TS which is CBR (constant bit rate) encoded, hence the transmission rate is known beforehand, the data rate of multimedia data (content) is constant, so that the data characteristics can be obtained in advance before the start of transmission. Alternatively, when a communication function of a constant rate which is offered by the communication scheme being used is used, and when the model of the wireless communication terminal (receiver) is known in some unspecified manner, there is a chance to able to identify the usable amount of reception buffer at a certain point of time.

Further, in the above embodiment, for convenience of explanation, it was assumed that a transmission band between the wireless communication terminal and the base station can be secured and that the time interval of intermittent periods is fixed and that the amount of transmission in every intermittent period is fixed. However, it is also possible to vary the amount of transmission in each intermittent period.

The Hint Track, defined by QuickTime File Format (QTFF) of Apple Computer offers recommended information of the packet size in each burst by RTP, and based on this information, the amount of transmission in each intermittent period can be determined. Conversely, it is also possible to use the information on the Hint Track in order to calculate the rate information of the multimedia data corresponding to FIG. 4 of the first embodiment.

Though, in the above embodiments, key frame animation was used for showing an example of data characteristics, the present invention can be applied to multimedia data that has the characteristics of the transmission rate continuously varying with passage of time, such as of MPEG-2 PS, which is VER (variable bit rate) encoded, by adopting an appropriate data characteristic representation.

Specifically, in the case of the first embodiment, the terminal provides the information of the usable amount of reception buffer to the base station by an appropriate means before acquisition of session information. In response to this, the base station, checking the target multimedia data, prepares, in advance, at least, one permissible communication schedule information of intermittent communication in conformity with the informed amount of reception buffer and the expected transmission environment. This information can be represented in a similar form to that in the first embodiment, and the base station returns this information to the terminal as the data characteristics as part of the session information. Thereafter, the information is handled in the same manner as in the first embodiment.

The important point to note concerning the above data characteristics is that total amount of data necessary up to a certain point of elapsed time should be known to avoid underflow while to avoid overflow the total amount of data that will have been used by a certain point of elapsed time should be known in addition to the former total amount. These amounts of data may be given as conservative estimation that will never cause misjudgment as to underflow and overflow.

For example, in a case of MPEG-2, since an I-picture and a P-picture are referred to when a B-picture is decoded, the B-picture may be released when its decoding ends. However, I-picture and P-picture cannot be released immediately from the buffer even when their decoding has been completed. Generally, the size of B-picture is smaller than that of I-picture or P-picture. Therefore, data characteristics may be constructed on the assumption that, for simplicity, every time a new I-picture (or P-picture) appears, the already used B-pictures are released from the buffer together with the pervious I-pictures (or P-pictures) that will not be referred to by any B-pictures and have become useless.

Alternatively, as a simplification, it is also possible to consider that the necessary total amount of data by a certain point of elapsed time and/or the total amount of data that will have been used by a certain point of elapsed time is approximated by simple functions such linear functions.

Also, when the average size of data to be held in the buffer per a minute length of time is small compared to the total buffer size, among the data characteristics the total amount of data that will have been used by a certain point of elapsed time can be neglected. In this case, there are cases in which reducing the amount of buffering at the beginning of a session acts effectively on prevention against overflow.

In sum, the essential feature of the data characteristics of the present invention is that the necessary total amount of data by a certain point of elapsed time and the total amount of data that will have been used by a certain point of elapsed time are known, but the present invention will not limit their format. As long as the data characteristics can be used for the calculation of the transmission schedule information which will not cause either overflow or underflow on the receiving side, if the calculation uses some approximation, the format of the data characteristics may be given by a format approximated correspondingly.

In general, when an approximate format is used, the representation of the data characteristics becomes simple and the sending cost of the data characteristics and the calculation cost of the intermittent period can be reduced, in compensation for a loss of the accuracy of the representation. Therefore, use of an approximate format is effective in some cases depending on the data format of multimedia data.

In the above embodiments, since the communicating means is assumed to conform to HiSWANa, the transmission band between the wireless communication terminal and the base station can be designated to a certain degree. For example, IEEE802.11e (the draft is under deliberation as of July 2002) and wireless protocols for data communications of the third-generation cellular phones are equipped with a QoS guarantee function. These protocols are also equipped with an intermittent communication function similar to HiSWANa, so that the present invention can be applied to these.

Generally, in most cases, QoS (quality of transmission service such as transmission rate, packet loss ratio, jitter, etc.) between a wireless communication terminal and a base station or between a server and a base station cannot be designated or kept constant by the user. In order to deal with such a case, it is possible to consider a configuration in which the actual QoS between a wireless communication terminal and a server in a streaming session is fed back to the server by the aforementioned RTCP or the like, so that the server is able to adaptively change the transmission rate of data and/or the redundancy of data (multiplicity, error correction information, etc.) during the session. In this way, the present invention can be also applied to wireless protocols which are used widely but is not equipped with a QoS function, such as IEEE802.11.

Further, in the above embodiments, when the base station or the wireless communication terminal has detected a change in rate or redundancy, it is possible to adjust the intermittent period so as not to cause underflow and overflow by increasing or decreasing the intermittent period using the second control process even when adoptive control is implemented.

As has been described heretofore, according to the data communication apparatus and its intermittent communication method of the present invention, upon receiving and playing multimedia data in parallel using a portable wireless communication terminal that mostly has a limited capacity of built-in memory, it is possible to transit the operation mode into an intermittent communication mode having as long a rest duration as possible, whereby it is possible to reduce power consumption at the wireless communication terminal.

INDUSTRIAL APPLICABILITY

The data communication apparatus, its intermittent communication method, the program describing the method and the recording medium for recording the program according to the present invention are suitably applied to, for example, portable wireless communication devices, base stations and others for streaming, achieving reception and playback of multimedia data in parallel, which are aimed at reducing power consumption by shifting operation into an intermittent communication mode having as long a rest duration as possible.

The invention claimed is:

1. An intermittent communication method for data communication apparatus, comprising:
    a reception step for receiving data transmitted intermittently from a communication partner side and storing the data into a buffer memory;
    a playback step for playing the stored data in the buffer memory in parallel with the reception step; a first setup step for setting up a first intermittent transmission schedule which will not cause either overflow or underflow of data in the buffer memory, based on a data characteristic of the data;
    a proposal step for transmitting the first intermittent transmission schedule to a communication partner side to make a proposal of the first intermittent transmission schedule in order to receive an approval or disapproval of the proposed first intermittent transmission schedule; and
    an electric power supply stop step for stopping electric power supply to an inter-node communicator during a non-transmission time based on a current intermittent transmission schedule of the data being transmitted intermittently.

2. The intermittent communication method for data communication apparatus according to claim 1, wherein the data characteristic includes an elapsed time after a start of data playback and a necessary total amount of data up to the elapsed time.

3. The intermittent communication method for data communication apparatus according to claim 1, wherein the data characteristic is information that can lead a necessary total amount of data up to an elapsed time after a start of data playback.

4. The intermittent communication method for data communication apparatus according to claim 2 or 3, wherein the data characteristic includes a total amount of data that will have been used by the elapsed time.

5. The intermittent communication method for data communication apparatus according to claim 2 or 3, wherein the data characteristic is information that can lead a total amount of data that will have been used by the elapsed time.

6. The intermittent communication method for data communication apparatus according to claim 1, wherein the first intermittent transmission schedule includes a data transmission rate.

7. The intermittent communication method for data communication apparatus according to claim 6, wherein the first intermittent transmission schedule includes an amount of buffering of data to be stored in advance in the buffer memory from a start of data transmission from a transmitter to a beginning of playback on a receiver.

8. The intermittent communication method for data communication apparatus according to claim 7, wherein the amount of buffering is set at the maximum.

9. The intermittent communication method for data communication apparatus according to claim 6, wherein the data transmission rate is set at the maximum.

10. The intermittent communication method for data communication apparatus according to claim 6, wherein the data transmission rate is set at the minimum.

11. The intermittent communication method for data communication apparatus according to claim 1, wherein the first intermittent transmission schedule includes intermittent communication information that represents the amount of data transmission in one intermittent period.

12. The intermittent communication method for data communication apparatus according to claim 11, wherein the intermittent communication information includes the time of transmission in each intermittent communication period.

13. The intermittent communication method for data communication apparatus according to claim 11, wherein the intermittent communication information includes the amount of data transmission in each intermittent communication period.

14. The intermittent communication method for data communication apparatus according to claim 11, wherein the intermittent communication information includes a data transmission rate in each intermittent communication period.

15. The intermittent communication method for data communication apparatus according to claim 1, wherein the first intermittent transmission schedule includes a start time of a new intermittent communication.

16. The intermittent communication method for data communication apparatus according to claim 1, further comprising:
    a comparison step for comparing the first intermittent transmission schedule with the current intermittent transmission schedule,
    wherein the proposal step is performed when the first intermittent transmission schedule is different from the current intermittent transmission schedule.

17. The intermittent communication method for data communication apparatus according to claim 16, wherein the communication partner side includes:
    a second setup step for setting up a second intermittent transmission schedule which will not cause either overflow or underflow of data in the buffer memory, based on the data characteristic; and
    a modification step for modifying the current intermittent transmission schedule into the second intermittent transmission schedule if the second intermittent transmission schedule is different from the current intermittent transmission schedule.

18. The intermittent communication method for data communication apparatus according to claim 16, wherein a receiver of the data implements the reception step, the playback step, the first setup step, the comparison step, the proposal step and the electric power supply stop step.

19. The intermittent communication method for data communication apparatus according to claim 16, wherein a transmitter of the data implements the first setup step while a receiver of the data implements the reception step, the playback step, the comparison step, the proposal step and the electric power supply stop step.

20. The intermittent communication method for data communication apparatus according to claim 16, wherein a transmitter of the data implements the first setup step, the comparison step and the proposal step while a receiver of the data implements data reception step, the playback step and the electric power supply stop step.

21. The intermittent communication method for data communication apparatus according to claim 17, wherein the data is transmitted from a single transmitter to first and second receivers, and the modification step is implemented between the transmitter and the first receiver and between the transmitter and the second receiver.

22. The intermittent communication method for data communication apparatus according to claim 16, wherein the first setup step, the comparison step and the proposal step are executed in a data link layer in terms of an OSI layer model.

23. A data communication apparatus for receiving data transmitted intermittently from a transmitting side, storing the data into a buffer memory and playing the data stored in the buffer memory in parallel with the data storing, comprising:
a multimedia data communication controller for setting up a intermittent transmission schedule which will not cause either overflow or underflow during a real-time playback of the data, based on a data characteristic of the data;
a communicator for transmitting the intermittent transmission schedule to the transmitting side to make a proposal of the intermittent transmission schedule in order to receive an approval or disapproval of the proposed intermittent transmission schedule and to receive data transmitted intermittently based on the intermittent transmission schedule; and
an electric power supply controller for stopping electric power supply to the communicator during a non-transmission time based on the intermittent transmission schedule.

24. The data communication apparatus according to claim 23, wherein the intermittent transmission schedule includes a time interval for alternation of intermittent communication or the amount of data transmission for alternation of intermittent communication.

25. A data communication apparatus for playing received data, comprising:
an inter-node communicator for transmission of a transmission schedule to and for reception of data from a communication partner appliance;
a buffer memory for storing the data received by the inter-node communicator;
a data player for playing the storage data stored in the buffer memory in parallel while the buffer memory is implementing a buffering process of storing the data;
a data quality manager for storing quality management information of the received data to be played;
a schedule judging portion for transmitting via the inter-node communicator a transmission schedule of the data to the communication partner appliance, according to which the buffer memory will not cause either overflow or underflow; and
an electric power supply controller for stopping electric power supply to the communicator during a non-transmission time based on the transmission schedule, wherein the transmission schedule is set up based on the quality management information.

26. A data communication apparatus, comprising:
an inter-node communicator for transmitting a transmission schedule to a communication partner appliance and receiving data from the communication partner appliance;
a data quality manager for storing quality management information of the data;
a schedule judging portion for transmitting via the inter-node communicator the transmission schedule of the data to the communication partner appliance, according to which a buffer memory of the communication partner appliance will not cause either overflow or underflow; and
an electric power supply controller for stopping electric power supply to the communicator during a non-transmission time based on the transmission schedule, wherein the transmission of the data is performed based on the transmission schedule and the transmission schedule is set up based on the quality management information.

27. The data communication apparatus according to claim 25 or 26, further comprising:
a data quality reference portion for transmitting the quality management information from the data quality manager to the schedule judging portion,
wherein the transmission schedule is set up by the schedule judging portion.

28. The data communication apparatus according to claim 25 or 26, further comprising:
a data quality reference portion for acquiring the quality management information from the data quality manager and setting up the transmission schedule.

29. The data communication apparatus according to claim 25 or 26, wherein the quality management information includes an elapsed time after a start of playback of the data and a necessary total amount of data up to the elapsed time.

30. The data communication apparatus according to claim 25 or 26, wherein the quality management information is information that can lead the necessary total amount of data up to an elapsed time after a start of playback of the data.

31. The data communication apparatus according to claim 29, wherein the quality management information includes a total amount of data that will have been used by the elapsed time.

32. The data communication apparatus according to claim 29, wherein the quality management information is information that can lead a total amount of data that will have been used by the elapsed time.

33. The data communication apparatus according to claim 25 or 26, wherein the transmission schedule includes a data transmission rate.

34. The data communication apparatus according to claim 33, wherein the transmission schedule includes an amount of buffering of data to be stored in advance in the buffer memory from a start of data transmission from a transmitter to a beginning of playback on a receiver.

35. The data communication apparatus according to claim 34, wherein the amount of buffering is set at the maximum.

36. The data communication apparatus according to claim 33, wherein the data transmission rate is set at the maximum.

37. The data communication apparatus according to claim 33, wherein the data transmission rate is set at the minimum.

38. The data communication apparatus according to claim 25 or 26, wherein the transmission schedule includes intermittent communication information that represents an amount of data transmission in one intermittent period.

39. The data communication apparatus according to claim 38, wherein the intermittent communication information includes a time of transmission in each intermittent communication period.

40. The data communication apparatus according to claim 38, wherein the intermittent communication information includes an amount of data transmission in each intermittent communication period.

41. The data communication apparatus according to claim 38, wherein the intermittent communication information includes a data transmission rate in each intermittent communication period.

42. The data communication apparatus according to claim 25 or 26, wherein the transmission schedule includes a start time of a new intermittent communication.

43. A program recorded on a recording medium for making a data communication apparatus execute the intermittent communication method according to claim 1.

44. The intermittent communication method for data communication apparatus according to claim 1, further comprising:

a second setup step for setting up a second intermittent transmission schedule in the communication partner side, based on the first intermittent transmission schedule; and a modification step for modifying the current intermittent transmission schedule into the second intermittent transmission schedule if the second intermittent transmission schedule is different from the current intermittent transmission schedule.

45. The intermittent communication method for data communication apparatus according to claim 1, wherein the first intermittent transmission schedule includes information that represents an intermittent communication period.

46. The data communication apparatus according to claim 23, wherein the transmission schedule includes the amount to be changed of data transmission in each intermittent communication period.

47. The data communication apparatus according to claim 25 or 26, wherein the intermittent transmission schedule includes information that represents an intermittent communication period.

* * * * *